(12) United States Patent
Donnelly et al.

(10) Patent No.: US 11,952,152 B1
(45) Date of Patent: Apr. 9, 2024

(54) SYSTEM OF DATA COMMUNICATION FOR AN ELECTRIC AIRCRAFT

(71) Applicant: BETA AIR, LLC, South Burlington, VT (US)

(72) Inventors: Richard Donnelly, South Burlington, VT (US); Charles Camron Guthrie, South Burlington, VT (US)

( * ) Notice: Subject to any disclaimer, the term of this patent is extended or adjusted under 35 U.S.C. 154(b) by 0 days.

(21) Appl. No.: 18/096,818

(22) Filed: Jan. 13, 2023

(51) Int. Cl.
*B64U 50/37* (2023.01)
*B60L 53/16* (2019.01)
*B64C 39/02* (2023.01)
*G06N 20/00* (2019.01)
*B64D 27/24* (2006.01)

(52) U.S. Cl.
CPC ............ *B64U 50/37* (2023.01); *B64C 39/024* (2013.01); *G06N 20/00* (2019.01); *B60L 53/16* (2019.02); *B60L 2200/10* (2013.01); *B64D 27/24* (2013.01)

(58) Field of Classification Search
CPC ....... B64U 50/37; B64C 39/024; G06N 20/00
See application file for complete search history.

(56) References Cited

U.S. PATENT DOCUMENTS

| 8,344,577 | B2 | 1/2013 | Osborne | |
|---|---|---|---|---|
| 8,533,948 | B2 | 9/2013 | Keller | |
| 8,662,851 | B2 | 3/2014 | Zadi | |
| 2017/0187539 | A1* | 6/2017 | Thompson | .......... H04W 12/068 |
| 2020/0106481 | A1* | 4/2020 | Mitchell | ................. H04B 3/56 |
| 2023/0135012 | A1* | 5/2023 | Wiegman | ............... B60L 53/66 320/109 |

\* cited by examiner

*Primary Examiner* — Michael C Zarroli
(74) *Attorney, Agent, or Firm* — Hoffman Warnick LLC

(57) ABSTRACT

A system for data communication for an electric aircraft is disclosed. The system may include a charging connector configured to mate with at least an electric aircraft port of the electric aircraft. The charging connector may be further configured to charge at least a battery pack of the electric aircraft, wherein the charging connector may include a housing configured to house at least a component of the charging connector and a pin configured to connect conductors. The system may include a computing device communicatively connected to the charging connector, wherein the computing device is configured to establish a data connection with the electric aircraft. The computing device is further configured to receive data over the data connection from the electric aircraft at a data transfer rate.

16 Claims, 10 Drawing Sheets

SYSTEM OF DATA COMMUNICATION FOR AN ELECTRIC AIRCRAFT

FIELD OF THE INVENTION

The present invention generally relates to the field of electric aircraft. In particular, the present invention is directed to data communication for an electric aircraft.

BACKGROUND

Electric aircraft presents a great promise for the future. Effectively and accurately communicating data for electric aircraft can be a difficult task and can pose technical challenges. Existing solutions to address the challenges are not sufficient.

SUMMARY OF THE DISCLOSURE

In an aspect, a system of data communication for an electric aircraft is presented the system may include a charging connector configured to mate with at least an electric aircraft port of the electric aircraft. The charging connector is further configured to charge at least a battery pack of the electric aircraft, wherein the charging connector may include a housing configured to house at least a component of the charging connector and a pin configured to connect conductors. The system may include a computing device communicatively connected to the charging connector, wherein the computing device is configured to establish a data connection with the electric aircraft. The computing device is further configured to receive data over the data connection from the electric aircraft at a data transfer rate.

In another aspect, a method of communicating data for electric aircraft using a charging connector is presented. The method may include mating a charging connector to the at least an electric aircraft port of an electric aircraft. The method may further include establishing, using a computing device communicatively connected to the charging connector, a data connection with the electric aircraft. The method may further include charging, using the charging connector, at least a battery pack of the electric aircraft. The method may further include receiving, using the computing device, data from the electric aircraft at a data transfer rate.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a system of data communication for electric aircraft. In an embodiment, the system may include a charging connector configured to mate with at least an electric aircraft port of the electric aircraft. The charging connector may be further configured to charge at least a battery pack of the electric aircraft.

Aspects of the present disclosure can be used to communicatively connect a charging connector to computing device. In an embodiment, the computing device may be configured to establish a data connection with the electric aircraft. In another embodiment, the computing device may be further configured to receive data over the data connection from the electric aircraft at a data transfer rate. Exemplary embodiments illustrating aspects of the present disclosure are described below in the context of several specific examples.

Figure 1:
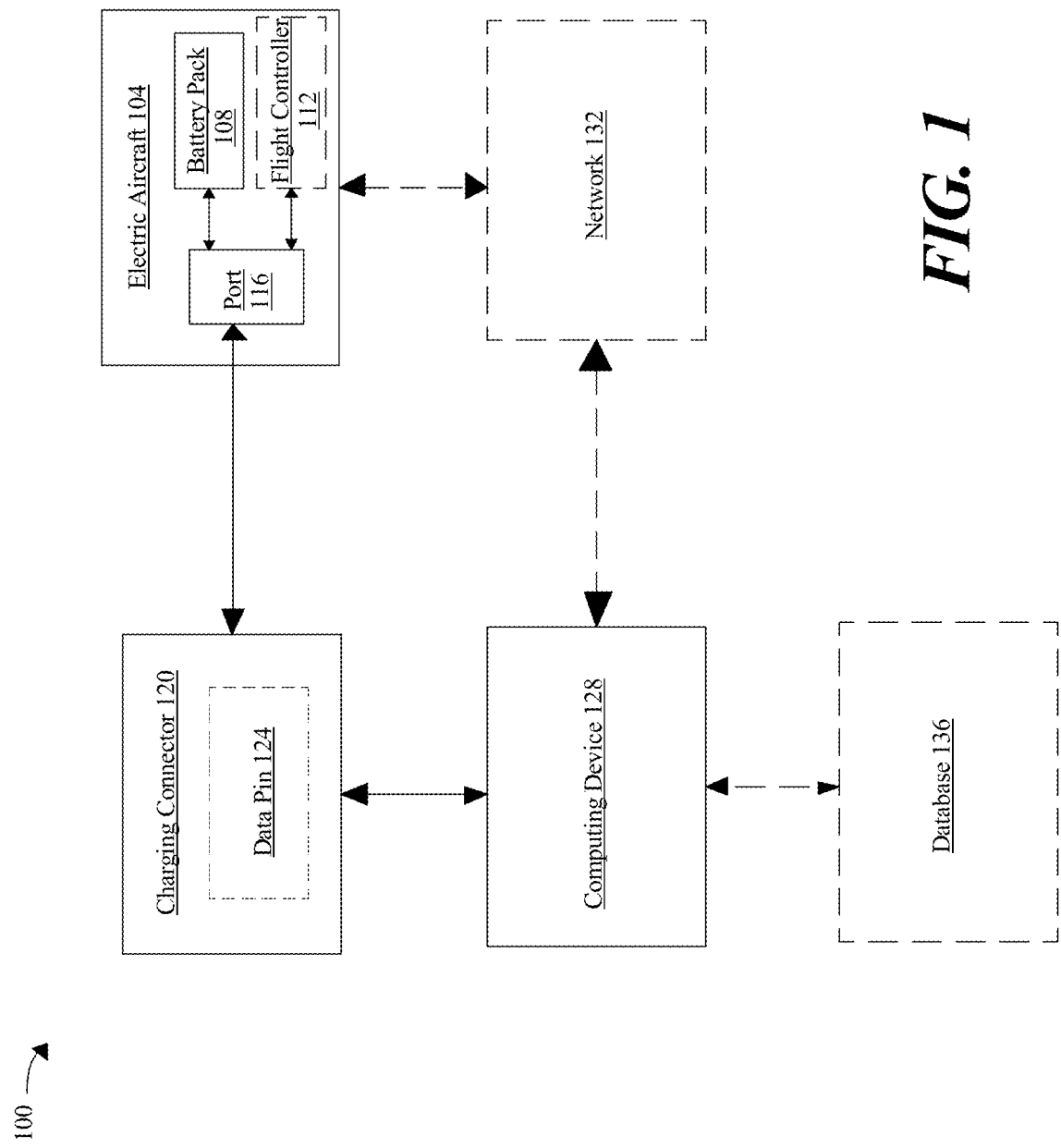
FIG. 1 is an exemplary diagram of a system of data communication for an electric aircraft.

Referring now to FIG. 1, an exemplary embodiment of system 100 for data communication for an electric aircraft using a charging connector is illustrated. In a non-limiting embodiment, system 100 may be used for any electric vehicles. As used in this disclosure, an "electric vehicle" is any electrically powered means of human transport, for example without limitation an electric aircraft or electric vertical take-off and landing (eVTOL) aircraft. In some cases, an electric vehicle or aircraft may include an energy source configured to power at least a motor configured to move the electric vehicle or aircraft. As used in this disclosure, an "electric aircraft" is an electrically powered aircraft such as one powered by one or more electric motors or the like. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. In some embodiments, electric aircraft 104 may include electric vertical takeoff and landing (eVTOL) aircraft. A "vertical take-off and landing (eVTOL) aircraft," as used in this disclosure, is one that can hover, take off, and land vertically. Electric aircraft 104 disclosed here is described in further detail with respect to FIG. 9.

With continued reference to FIG. 1, in some embodiments, electric aircraft 104 may include at least a battery pack 108. The at least a battery pack 108 may include at least a battery subpack. "Battery pack," as used in this disclosure, is a set of battery modules. "Battery subpack," as used in this disclosure, is a subset of battery modules. The at least a battery subpack disclosed here is described in further detail with respect to FIGS. 4-5. The at least a battery subpacks may include at least a battery module. "Battery module," as used in this disclosure, is a set of battery cells. The at least a battery module disclosed here is described in further detail with respect to FIGS. 4-5. The at least a battery module may include at least a battery cell. A "battery cell" as described herein, is a single anode and cathode separated by electrolyte, wherein the cell produces voltage and current. The at least a battery cell is described in further detail with respect to FIGS. 4-5. The at least a battery module may include a cooling plate. A "cooling plate" as described herein, is a thermally conductive component separating each column of a plurality of the at least a battery cell within a respective battery unit. The cooling plate disclosed here is described in further detail with respect to FIGS. 4-5.

With continued reference to FIG. 1, in some embodiments, electric aircraft 104 may include at least a battery pack 108. In some embodiments, electric aircraft 104 may include two or more of the at least a battery pack 108. In an embodiment, the plurality of the at least a battery pack 108 may be placed in one spot in electric aircraft 104. In another embodiment, the plurality of the at least a battery pack 108 may be sparsely placed in electric aircraft 104. As a non-limiting example, a battery pack 108 of the plurality of the at least a battery pack 108 may be placed in the middle of a fuselage of electric aircraft 104, while another battery pack 108 of the plurality of the at least a battery pack 108 is placed in the left side of the fuselage. As another non-limiting example, a battery pack 108 of the plurality of the at least a battery pack 108 may be placed in forward of a fuselage of electric aircraft 104, while another battery pack 108 of the plurality of the at least a battery pack 108 may be placed in aft of the fuselage. As used in this disclosure a "fuselage" is the main body of an aircraft, or in other words, the entirety of the aircraft except for the cockpit, nose, wings, empennage, nacelles, any and all control surfaces, and generally contains an aircraft's payload. The fuselage disclosed herein is described in further detail with respect to FIG. 10.

With continued reference to FIG. 1, in some embodiments, at least a battery pack 108 may include a sensor. A "sensor," as used in this disclosure, is a device that produces an output signal for the purpose of sensing a physical phenomenon. The sensor may include a temperature sensor. A "temperature sensor," as used in this disclosure, is a device that detects heat and converts it into an electrical signal. As a non-limiting example, the temperature sensor may include thermocouples, thermistors, thermometers, passive infrared sensors, resistance temperature sensors (RTD's), semiconductor based integrated circuits (IC), a combination thereof or another undisclosed sensor type, alone or in combination. "Temperature," as used in this disclosure, and as would be appreciated by someone of ordinary skill in the art, is a measure of the heat energy of a system. Temperature, as measured by any number or combinations of sensors, may be measured in Fahrenheit (° F.), Celsius (° C.), Kelvin (° K.), or another scale alone or in combination. The temperature measured by sensors may comprise electrical signals which are transmitted to their appropriate destination wireless or through a wired connection.

With continued reference to FIG. 1, in some embodiments, at least a battery pack 108 may be communicatively connected to at least an electric aircraft port 116. The at least an electric aircraft port 116 is described further below. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, in some embodiments, at least a battery pack 108 may be connected to at least an electric aircraft port 116 using a connecting line. A "connecting line," as used in this disclosure, is a connector that connects a battery pack and a port. As a non-limiting example, the connecting line may be a bundle of tethers, e.g., hose, tubing, cables, wires, and the like. In an embodiment, the connecting line may be removable. In another embodiment, the connecting line may be permanently attached to the at least a battery pack 108 and/or the at least an electric aircraft port 116. In an embodiment, the connecting line may include a coolant tube. The coolant tube disclosed herein is further described in detail below. In another embodiment, the connecting line may include a conductor. The conductor disclosed herein is further described in detail below.

With continued reference to FIG. 1, in some embodiments, electric aircraft 104 may include flight controller 112. As used in this disclosure a "flight controller" is a computing device of a plurality of computing devices dedicated to data storage, security, distribution of traffic for load balancing, and flight instruction. Flight controller 112 may include and/or communicate with any computing device as described in this disclosure, including without limitation a microcontroller, microprocessor, digital signal processor (DSP) and/or assembly on a chip (SoC) as described in this disclosure. Further, flight controller 112 may include a single computing device operating independently, or may include two or more computing device operating in concert, in parallel, sequentially or the like; two or more computing devices may be included together in a single computing device or in two or more computing devices. In a non-limiting embodiment, system 100 may include a computing device wherein the computing device may include flight controller 112 configured to facilitate communication between a plurality of aircrafts and their flight controllers. In embodiments, flight controller 112 may be installed in an aircraft, may control the aircraft remotely, and/or may include an element installed in the aircraft and a remote element in communication therewith. In some embodiments, flight controller 112 may be configured to generate a node as described in FIG. 2. In some embodiments, flight controller 112 may be communicatively connected to an electric aircraft port 116. As a non-limiting example, flight controller 112 may be connected to an electric aircraft port 116 with a connecting line. The connecting line is further described above. Flight controller is further described in FIG. 6.

With continued reference to FIG. 1, in some embodiments, electric aircraft 104 may include an electric aircraft port 116. A "port," as used in this disclosure, is an interface for example of an interface configured to receive another component or an interface configured to transmit and/or receive signal on a computing device. As used in this disclosure, an "electric aircraft port" is a port located on an electric aircraft, wherein the port is used to mate with a connector, such as but not limited to charging connector 120. As used in this disclosure, "mate" is an action of attaching two or more components together. Mating may be performed using a mechanical or electromechanical means described in this disclosure. For example, without limitation mating may include an electromechanical device used to join electrical conductors and create an electrical circuit. A "conductor," as used in this disclosure, is an object or type of material that allows the flow of charge (electric current) in one or more directions. As a non-limiting example, the electromechanical device may include a pin. The pin is disclosed further in detail below. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connecting line. In some cases, mate may be lockable. Connecting lines disclosed herein may be consistent with a connector disclosed in U.S. patent application Ser. No. 17/405,840 entitled "CONNECTOR AND METHODS OF USE FOR CHARGING AN ELECTRIC VEHICLE," which is incorporated in its entirety herein by reference.

With continued reference to FIG. 1, in some embodiments, at least an electric aircraft port 116 may include a charging port. A "charging port," as used in this disclosure, is a port used for charging an electric aircraft. The at least an electric aircraft port 116 may include a cooling port. A "cooling port," as used in this disclosure, is a port that is used to provide a coolant flow. The coolant flow is further described below. The at least an electric aircraft port 116 may include a data port. A "data port," as used in this disclosure, is a port that is used for data communication. The at least an electric aircraft port 116 may be used for both charging and data communication. The at least an electric aircraft port 116 may be used for all charging, providing the coolant flow and data communication. The at least an electric aircraft port 116 may be but not limited to on the right, left, middle, top, bottom, or other side of electric aircraft 104. Electric aircraft 104 may include a plurality of same the at least an electric aircraft port 116. As a non-limiting example, electric aircraft 104 may include six charging ports. Electric aircraft 104 may include a plurality of different the at least an electric aircraft port 116. As a non-limiting example, electric aircraft 104 may include three charging ports, two cooling ports, and one data port. The at least an electric aircraft port 116 may be visible on a surface of electric aircraft 104. The at least an electric aircraft port 116 may be covered with a cover. The at least an electric aircraft port 116 may be accessible as the cover is opened. The cover may be closed after the at least an electric aircraft port 116 is being used. The cover may open and close manually by a human. The cover may open and close by a command from a flight controller. The flight controller is further described below.

With continued reference to FIG. 1, in some embodiments, system 100 may include charging connector 120. "Charging connector," as used in this disclosure, is a device adapted to electrically connect a device to be charged with an energy source. As a non-limiting example, charging connector 120 may be configured to charge at least a battery pack 108 of electric aircraft 104. In some embodiments, charging connector 120 may include a housing. As used in this disclosure, a "housing" is a physical component within which other internal components are located. In some cases, internal components with housing will be functional while function of housing may largely be to protect the internal components. Housing may be configured to mate with a port, for example at least a port 116. In some embodiments, charging connector 120 may include a fastener. As used in this disclosure, a "fastener" is a physical component that is designed and/or configured to attach or fasten two (or more) components together. Charging connector 120 may include one or more attachment components or mechanisms, for example without limitation fasteners, threads, snaps, canted coil springs, and the like. In some cases, charging connector 120 may be connected to at least a port 116 by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, charging connector 120 may be connected to port 108 by way of magnetic force. For example, charging connector 120 may include one or more of a magnetic, a ferro-magnetic material, and/or an electromagnet. Fastener may be configured to provide removable attachment between charging connector 120 and at least a port 116. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata. Charging connector 120 disclosed herein may be consistent with a connector housing disclosed in U.S. patent application Ser. No. 17/405,840 entitled "CONNECTOR AND METHODS OF USE FOR CHARGING AN ELECTRIC VEHICLE," which is incorporated in its entirety herein by reference. Additionally, charging connector 120 disclosed herein may be consistent with a casing disclosed in U.S. patent application Ser. No. 17/752,248, entitled "GROUND SERVICE SYSTEMS AND DEVICES FOR AN ELECTRIC AIRCRAFT," which is incorporated in its entirety herein by reference.

With continued reference to FIG. 1, in some embodiments, charging connector 120 may include a pin. A "pin," as used in this disclosure, is a type of connector that joins conductors and by joining conductors, enable any type of communication, such as but not limited to data communication, fluidic communication, and the like. Data communication and fluidic communication are described in further detail below. In some embodiments, a pin may be any type of electrical pin. An electrical pin is a device used to join electrical conductors to create a circuit. As a non-limiting example, in some embodiments, any pin of charging connector 120 may be the male component of a pin and socket pin. In other embodiments, any pin of charging connector 120 may be the female component of a pin and socket pin. As a further example of an embodiment, a pin may have a keying component. A keying component is a part of an electrical pin that prevents the electrical pin components from mating in an incorrect orientation. As a non-limiting example, this can be accomplished by making the male and female components of an electrical pin asymmetrical. Additionally, in some embodiments, a pin, or multiple connectors, of charging connector 120 may include a locking mechanism. For instance, as a non-limiting example, any pin of charging connector 120 may include a locking mechanism to lock the connectors in place. The pin or connectors of charging connector 120 may each be any type of the various types of electrical connectors disclosed above, or they could all be the same type of electrical pin. One of ordinary skill in the art, after reviewing the entirety of this disclosure, would understand that a wide variety of electrical connectors may be suitable for this application.

With continued reference to FIG. 1, in some embodiments, charging connector 120 may include a DC pin. DC pin supplies DC power. "DC power," for the purposes of this disclosure refers to, a one-directional flow of charge. For example, in some embodiments, DC pin may supply power with a constant current and voltage. As another example, in other embodiments, DC pin may supply power with varying current and voltage, or varying currant constant voltage, or constant currant varying voltage. In another embodiment, when charging connector 120 is charging certain types of batteries, DC pin may support a varied charge pattern. This involves varying the voltage or currant supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like.

With continued reference to FIG. 1, in some embodiments, charging connector 120 may include an AC pin. An AC pin supplies AC power. For the purposes of this disclosure, "AC power" refers to electrical power provided with a bi-directional flow of charge, where the flow of charge is periodically reversed. AC pin may supply AC power at a variety of frequencies. For example, in a non-limiting embodiment, AC pin may supply AC power with a frequency of 50 Hz. In another non-limiting embodiment, AC pin may supply AC power with a frequency of 60 Hz. One of ordinary skill in the art, upon reviewing the entirety of this disclosure, would realize that AC pin may supply a wide variety of frequencies. AC power produces a waveform when it is plotted out on a current vs. time or voltage vs. time graph. In some embodiments, the waveform of the AC power supplied by AC pin may be a sine wave. In other embodiments, the waveform of the AC power supplied by AC pin may be a square wave. In some embodiments, the waveform of the AC power supplied by AC pin may be a triangle wave. In yet other embodiments, the waveform of the AC power supplied by AC pin may be a sawtooth wave. The AC power supplied by AC pin may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 1, in some embodiments, charging connector 120 may include a ground pin. A ground pin is an electronic pin that is connected to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 1, in some embodiments, charging connector 120 may include data pin 124. For the purposes of this disclosure, a "data pin" is an electric pin configured to conduct wired data communication. As used in this disclosure, "data communication" is an attribute wherein two or more relata interact with one another by way of data flow or data in general. As a non-limiting example, data communication may be conducted between charging connector 120 and flight controller 112. As another non-limiting example, data communication may be conducted between charging connector 120 and battery pack 108. As another non-limiting example, data communication may be conducted between charging connector 120 and electric aircraft port 116. As another non-limiting example, data communication may be conducted between charging connector 120 and computing device 128. "Data," as used in this disclosure, is a collection of discrete values that convey information, describing quantity, quality, fact, statistics, other basic units of meaning, or simply sequences of symbols that may be further interpreted. As a non-limiting example, data of data communication between flight controller 112 and charging connector 120 may include a machine-learning data of electric aircraft 104 from flight controller 112. "Machine-learning data," as used in this disclosure, is data related to a machine learning process. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language. Machine-learning process is further disclosed with respect to FIG. 7. In some embodiments, the machine-learning data may include data for autonomous function data generated as a function of autonomous machine learning. Specifically, data may include flight data such as speed of flight, flight path, external environmental data, and the like to be used as training. As used in this disclosure an "autonomous function" is a mode and/or function of flight controller 112 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element. As used in this disclosure an "autonomous machine-learning model" is a machine-learning model to produce an autonomous function output given flight element and a pilot signal as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal may denote that a pilot is controlling and/or maneuvering ailerons, wherein the pilot is not in control of the rudders and/or propulsors. In an embodiment, pilot signal may include an implicit signal and/or an explicit signal. For example, and without limitation, pilot signal may include an explicit signal, wherein the pilot explicitly states there is a lack of control and/or desire for autonomous function. As a further non-limiting example, pilot signal may include an explicit signal directing flight controller 112 to control and/or maintain a portion of aircraft, a portion of the flight plan, the entire aircraft, and/or the entire flight plan. As a further non-limiting example, pilot signal may include an implicit signal, wherein flight controller 112 detects a lack of control such as by a malfunction, torque alteration, flight path deviation, and the like thereof. In an embodiment, and without limitation, pilot signal may include one or more explicit signals to reduce torque, and/or one or more implicit signals that torque may be reduced due to reduction of airspeed velocity. In an embodiment, and without limitation, pilot signal may include one or more local and/or global signals. For example, and without limitation, pilot signal may include a local signal that is transmitted by a pilot and/or crew member. As a further non-limiting example, pilot signal may include a global signal that is transmitted by air traffic control and/or one or more remote users that are in communication with the pilot of aircraft. In an embodiment, pilot signal may be received as a function of a tri-state bus and/or multiplexor that denotes an explicit pilot signal should be transmitted prior to any implicit or global pilot signal. Autonomous function and autonomous machine learning model are further disclosed with respect to FIG. 6. In some embodiments, data of data communication between flight controller 112 and charging connector 120 may include flight status such as but not limited to flight duration, flight route, aircraft status, flight data, and the like. In some embodiments, data of data communication between battery pack 108 and charging connector 120 may include charging rate. A "charging rate," as used in this disclosure, is a rate at which current is applied to battery to restore its capacity. As a non-limiting example, at least a battery pack 108 may request a charging rate of 1C. The battery C rating is a measurement of current in which a battery is charged and discharged at. As a non-limiting example, 1C rate of a battery means a fully charged battery with a capacity of 10 Ah may be able to provide 10 Amps for one hour. As another non-limiting example, 10 Ah battery being discharged at a C rating of 0.5C may provide 5 Amps over two hours, and if discharged at a 2C rate, it may provide 20 Amps for 30 minutes. Data communication and wired data communication disclosed herein are further described below. In some embodiments, machine learning data may include training data. In some embodiments, machine learning data may include the inputs and/or associated outputs of a machine learning model.

With continued reference to FIG. 1, "training data," as used herein, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data. Training data herein may be consistent with training data in FIG. 7.

With continued reference to FIG. 1, charging connector 120 may include a variety of additional connectors. As a non-limiting example, charging connector 120 may include a proximity detection pin. Proximity detection pin has no current flowing through it when charging connector 120 is not connected to a port. Once charging connector 120 is connected to a port, then proximity detection pin will have current flowing through it, allowing for the controller to detect, using this current flow, that the charging connector 120 is connected to a port. may additionally include a proximity sensor. Proximity sensor may be electrically communicative with a proximity signal conductor. Proximity sensor may be configured to generate a proximity signal as a function of connection between charging connector 120 and at least a port 116. As used in this disclosure, a "proximity sensor" is a sensor that is configured to detect at least a phenomenon related to charging connector 120 being mated to at least a port 116. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. As another non-limiting example, charging connector 120 may include a coolant pin. A coolant pin is a pin to join coolant tubes to direct a coolant flow. As used in this disclosure, a "coolant tube" is a component that is substantially impermeable to a coolant and contains and/or directs a coolant flow. As used in this disclosure, a "flow of coolant" is a stream of coolant. In some cases, coolant may include a fluid and coolant flow is a fluid flow. The coolant tube may be in fluidic communication with a coolant source. As used in this disclosure, a "coolant source" is an origin, generator, reservoir, or flow producer of coolant. In some cases, a coolant source may include a flow producer, such as a fan and/or a pump. Coolant source may include any of following non-limiting examples, air conditioner, refrigerator, heat exchanger, pump, fan, expansion valve, and the like. In some cases, a coolant source may be ground service equipment. Ground service equipment disclosed herein is further described below. In some embodiments, a coolant tube may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating.

With continued reference to FIG. 1, in some embodiments, coolant flow may occur synchronously and/or asynchronously with charging. For example, in some case, a flow of coolant may be provided prior to charging a battery of an electric aircraft 104. In some embodiments, coolant tube may facilitate fluidic and/or thermal communication with coolant source and at least a battery when at least a charging connector 120 is connected to at least a port 116. Alternatively and/or additionally, coolant tube may facilitate fluidic and/or thermal communication with coolant source and a cabin and/or cargo-space of electric aircraft 104 when at least a charging connector 120 is connected to at least a port 116.

With continued reference to FIG. 1, charging connector 128 may be incorporated with a charging station. Charging station may include an energy source. An "energy source," for the purposes of this disclosure, is a source of electrical power. In some embodiments, energy source may be an energy storage device, such as, for example, a battery or a plurality of batteries. Additionally, energy source need not be made up of only a single electrochemical cell, it can consist of several electrochemical cells wired in series or in parallel. In other embodiments, energy source may be a connection to the power grid. For example, in some non-limiting embodiments, energy source may include a connection to a grid power component. Grid power component may be connected to an external electrical power grid. In some other embodiments, the external power grid may be used to charge batteries, for example, when energy source includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Some components of charging station 100 may be consistent with the charger disclosed in U.S. application Ser. No. 17/477,987 filed on Sep. 17, 2021, titled "Systems and Methods for Adaptive Electric aircraft," the entirety of which is hereby incorporated by reference. Additionally, some components of charging station may be consistent with the charger disclosed in U.S. application Ser. No. 17/515,448 filed on Oct. 31, 2021, titled "Systems and Methods for an Immediate Shutdown of an Electric aircraft Charger," the entirety of which is hereby incorporated by reference.

With continued reference to FIG. 1, in some embodiments, charging station may include a charging cable. In some embodiments, charging connector 120 may be electrically connected with a charging cable. A "charging cable," for the purposes of this disclosure is a conductor or conductors adapted to carry power for the purpose of charging an electronic device. Charging cable is configured to carry electricity. Charging cable is electrically connected to the energy source. "Electrically connected," for the purposes of this disclosure, means a connection such that electricity can be transferred over the connection. In some embodiments, charging cable may carry AC and/or DC power to a charging connector 120. The charging cable may include a coating, wherein the coating surrounds the conductor or conductors of charging cable. One of ordinary skill in the art, after having reviewed the entirety of this disclosure, would appreciate that a variety of coatings are suitable for use in charging cable. As a non-limiting example, the coating of charging cable may comprise rubber. As another non-limiting example, the coating of charging cable may comprise nylon. Charging cable may be a variety of lengths depending on the length required by the specific implementation. As a non-limiting example, charging cable may be 10 feet. As another non-limiting example, charging cable may be 25 feet. As yet another non-limiting example, charging cable may be 50 feet. Charging cable may be a pay in or pay out cable. The paying in and paying out is further disclosed below.

With continued reference to FIG. 1, charging connector 120 may be incorporated with ground service equipment. "Ground service equipment" or "GSE," as used in this disclosure, is support equipment that supports the operations of aircraft whilst the aircraft is on the ground. For instance, ground service equipment may be used to charge electrical aircraft 104. In some cases, ground service equipment may be connected to electric aircraft 104 during support. Ground service equipment may include ground charging equipment, cooling equipment, and the like. "Ground charging equipment," as used in this disclosure, is ground service equipment that is used to charge electrical aircraft 104. Ground service equipment may include a ground service equipment cable. "Ground service equipment cable," as used in this disclosure, is a cable that is used for communications between ground service equipment and a device that is connected to the cable. Charging connector 120 may be electrically connected to ground service equipment cable. Ground service equipment may pay in or pay out the ground service equipment cable. As used in this disclosure, "paying out" a cable is increasing a free length of a cable, i.e., increasing slack in the cable. As used in this disclosure, a "free length of cable" is a length of cable that is external to a housing of the cable such as a storage device. In some cases, paying out cable may actually move a free end of cable, for example if the cable is sufficiently rigid. Alternatively or additionally, paying out a cable may increase a usable length of a cable. Paying out may be referred to in this disclosure as unspooling, without necessarily limiting a meaning of the term, for example to a device having a spool of cable. Paying out may also be referred to in this disclosure as extending. Conversely, as used in this disclosure, "paying in" a cable refers to decreasing a free length of a cable, i.e., decreasing slack in the cable. In some cases, paying in a cable may retract a free end toward a housing and/or reel. Alternatively or additionally, paying in a cable may just decrease a usable length of a cable. Paying in may be referred to in this disclosure as unspooling, without necessarily limiting a meaning of the term, for example to a device having a spool of cable. Ground service equipment may be consistent with a ground service device in U.S. patent application Ser. No. 17/752,248 entitled "GROUND SERVICE SYSTEMS AND DEVICES FOR AN ELECTRIC AIRCRAFT," which is incorporated in its entirety herein by reference. Alternatively or additionally, ground service equipment may be consistent with a ground support cart in U.S. patent application Ser. No. 17/405,662 entitled "A GROUND SUPPORT CART FOR CHARGING AN ELECTRIC AIRCRAFT AND A METHOD OF USE," which is incorporated in its entirety herein by reference.

With continued reference to FIG. 1, charging connector 120 may be communicatively connected to computing device 128. Computing device is further disclosed in FIG. 6. In some embodiments, computing device 128 may establish a data connection with electric aircraft 104. The data connection may be consistent with a data communication disclosed above. In an embodiment, the data connection may be wireless connection. "Wireless connection," as used in this disclosure, refers to any telecommunications or data transfer in which electromagnetic waves carry signals over all or part of data communication path rather than some form of wire or cable. The wireless connection may include a Li-Fi connection. "Li-Fi," as used in this disclosure, is a wireless communication technology which utilizes light to transmit data between devices. Li-Fi is capable of transmitting data at high speeds over the visible light, ultraviolet, and infrared spectrums. The wireless connection may include Bluetooth connection. "Bluetooth", as used in this disclosure, is a short-range wireless technology standard that is used for exchanging data between fixed and/or mobile devices over short distances. Bluetooth operates at frequencies between 2.402 and 2.480 GHz, or 2.400 and 2.4835 GHz, including guard bands 2 MHz wide at the bottom end and 3.5 MHz wide at the top. This is in the globally unlicensed (but not unregulated) industrial, scientific and medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 1600 hops per second, with adaptive frequency-hopping (AFH) enabled. Bluetooth Low Energy uses 2 MHz spacing, which accommodates 40 channels. The wireless connection may include NFC connection. "Near-field communication," also called "NFC," as used in this disclosure, is a short-range wireless connectivity technology that uses magnetic field induction to enable communication between devices when they're touched together or brought close to each other. The wireless connection may include a Wi-Fi connection. "Wi-Fi," as used in this disclosure, is a type of wireless network that allows nearby digital devices to exchange data by radio waves. Digital devices may communicate by sending each other data packets, blocks of data individually sent and delivered over radio. Digital devices may include but not limited to computing device 128, flight controller 112, and the like. "Data packet," as used in this disclosure, is a formatted unit of data carried by a packet-switched network. The "packet-switched network," as used in this disclosure, is a method of grouping data into packets that are transmitted over a digital network. Wi-Fi may be used to provide local network and Internet access to devices that are within Wi-Fi range of one or more routers that are connected to the Internet. Wi-Fi may use radio frequency ranges of, without limitation, 900 MHz, 2.4 GHz, 3.6 GHz, 4.9 GHz, 5 GHz, 5.9 GHz and 60 GHz bands.

With continued reference to FIG. 1, in another embodiment, the data connection may be wired connection. "Wired connection," as used in this disclosure, is a communicative connection that is over a wire-based communication technology. As a non-limiting example, the wired connection may include data connection using a data connector in charging connector 120. The wired connection may include an optic fiber connection. The optic fiber connection is a method of transmitting information from one place to another by sending pulses of infrared light through an optical fiber. The light is a form of carrier wave that is modulated to carry information. The wired connection may include an ethernet connection. Ethernet is a family of wired computer networking technologies commonly used in local area networks (LAN), metropolitan area networks (MAN) and wide area networks (WAN). Ethernet supports high bit rates, a great number of nodes, and long link distances.

With continued reference to FIG. 1, in an embodiment, data connection may be conducted simultaneously as charging connector 120 is charging at least a battery pack 108 of electric aircraft 104. As a non-limiting example, the data connection may be conducted as charging connector 120 is mated with at least a port 116. In another embodiment, charging connector 120 may asynchronously charge the at least a battery pack and establish the data connection.

"Establishing a data conduction," as used in this disclosure, refers to establish a connection between devices to enable data transfer using not limited to a wired connection, wireless connection, network, and the like. The wired connection, wireless connection, and network are disclosed in further detail in this entirely of disclosure. As a non-limiting example, data connection may be established by connecting data pin 124 of charging connector 120 and electric aircraft port 116. As another non-limiting example, data connection between flight controller 112 and computing device 128 may be established using Bluetooth. In an embodiment, charging connector 120 may establish the data connection after the charging connector 120 starts charging the at least a battery pack 108. In another embodiment, charging connector 120 may conduct the data connection before charging connector 120 starts charging the at least a battery pack 108. In some embodiments, there may be no data communication conducted using charging connector 120 when charging connector 120 is charging the at least a battery pack 108. As a non-limiting example, charging connector may only be used to charge the at least a battery pack 108. In some embodiments, charging connector 120 may only be used for data communication.

With continued reference to FIG. 1, in some embodiments, computing device 128 may receive data over data connection from electric aircraft 104 at a data transfer rate. A data transfer rate, as used in this disclosure and also known as bandwidth, is measured as the amount of data that can be transferred from one point or location to another in a specific amount of time. The points or locations may be within a given network. Typically, bandwidth is expressed as a bitrate and measured in bits per second (bps). In some instances, bandwidth may also indicate a range within a band of wavelengths, frequencies, or energies, for example and without limitation, a range of radio frequencies which is utilized for a particular communication. In an embodiment, the data transfer rate between computing device 128 and electric aircraft 104 may be higher than 1 Gbit/s. In another embodiment, the data transfer rate between computing device 128 and electric aircraft 104 may be lower than 1 Gbit/s. In some embodiments, computing device 128 may receive data over data connection from electric aircraft 104 at a data transfer period. "Data transfer period," as used in this disclosure, is a period it takes for computing device to receive data from another computing device. In an embodiment, the data transfer period of transferring data from electric aircraft 104 to computing device 104 through wired data connection may be less than an hour. In another embodiment, the data transfer period of transferring data from electric aircraft 104 to computing device 104 through wired data connection may be longer than an hour.

With continued reference to FIG. 1, in some embodiments, computing device 128 may transmit the data to database 136. Database 136 may be implemented, without limitation, as a relational database, a key-value retrieval database such as a NOSQL database, or any other format or structure for use as a database that a person skilled in the art would recognize as suitable upon review of the entirety of this disclosure. Database 136 may alternatively or additionally be implemented using a distributed data storage protocol and/or data structure, such as a distributed hash table or the like. Database 136 may include a plurality of data entries and/or records as described above. Data entries in a database 136 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, computing device 128 may authenticate electric aircraft 104 before conducting a data connection. In an embodiment, authentication may be implemented once charging connector 120 is plugged into electric aircraft port 116. In another embodiments, authentication may be performed by using a wireless connection between flight controller 112 and computing device 128. In some embodiments, authentication may be performed using network 132. Network 132 is described further detail below and with respect to FIGS. 2-3. In some embodiments, electric aircraft 104 may include an authentication datum and a current aircraft datum. An "authentication datum," as used in this disclosure, is an element of information associated with an electric aircraft that may be used to verify an identity of the electric aircraft and/or to authorize transmission of aircraft update datum to the electric aircraft and/or charging of the electric aircraft at a particular charging structure, station or connector, and an identity of the electric aircraft or a user thereof. Authentication maybe considered to be a process or action of verifying an identity of a user or process. The same (or different) authentication may be used to authorize charging at a plurality or network of charging stations. Authentication may include, for example and without limitation, password-based authentication, multi-factor authentication, certificate-based authentication, biometric authentication, token-based authentication, and the like, among others. Authentication datum may include information, data or credentials on or relating to, for example, and without limitation, vehicle identification number (VIN) of electric aircraft, radio-frequency identification (RFID) associated with electric aircraft, registration and/or licensing of aircraft and/or pilot, identity of pilot of electric aircraft (e.g. credential, license or biometric based), identity of owner of electric aircraft, membership of pilot and/or aircraft in a fleet, airline, association, club, or the like, appointment time or reservation made for charging electric aircraft, and the like, among others. In some cases, authentication datum may include a password or passcode which has to be entered, additionally or alternatively, to other authentication datum, data or information. Authentication datum may also be transmitted to charging connector 120 by an independent device onboard or remote from electric aircraft, for example and without limitation, from a smartphone or tablet of a pilot or other operator. In a non-limiting embodiment, authentication datum may include a digital signature, for example, signed by a computing device on electric aircraft such as flight controller 112, or the like. For instance and without limitation, authentication datum may be consistent with the authentication datum in U.S. patent application Ser. No. 17/562,082, and entitled, "METHODS AND SYSTEMS FOR AUTHENTICATION OF AN ELECTRIC AIRCRAFT FOR RECHARGING," which is incorporated by reference herein in its entirety. Additional disclosure regarded data authentication may be found in U.S. patent application Ser. No. 17/732,274 and entitled "AN ASSEMBLY FOR AUTHENTICATED COMMUNICATION OF DATA DURING RECHARGE OF AN ELECTRIC AIRCRAFT," which is incorporated by reference herein in its entirety.

With continued reference to FIG. 1, "current aircraft datum," as used in this disclosure, is an element of information associated with an electric aircraft and its flight.

Current aircraft datum may include flight information such as flight plan, itinerary, flight path, cargo logistics, personnel information, aircraft history, and the like thereof. In a non-limiting embodiment, current aircraft datum may be used to authorize the updating of flight information for electric aircraft 104. In some embodiments, current aircraft datum may be up to date in which it may be used to confirm that electric aircraft 104 has the most recent flight information. Current aircraft datum may include operation information such as any information describing the maintenance, repair, and overhaul of electric aircraft 104 or an electric aircraft's flight components. This may include a record of maintenance activities and their results including a plurality of tests, measurements, replacements, adjustments, repairs, and the like, that may be intended to retain and/or restore a functional unit of an electric aircraft. plurality of measured aircraft operation datum may include a record of data of, but not limited to, functional checks, servicing, repairing or replacing of necessary devices, equipment, machinery, and the like, pertaining to electric aircraft 104. In a non-limiting embodiment, current aircraft datum may include a unique identification number denoting a part of electric aircraft 104 that was installed, repaired, or replaced as a function of an aircraft maintenance. In a non-limiting embodiment, the current aircraft datum may include a record of maintenance and/or repair schedules corresponding to electric aircraft 104. In another non-limiting embodiment, aircraft current datum may include a record of potential maintenance and repair schedules corresponding to electric aircraft 104. A "maintenance schedule," for the purposes of this disclosure, refer to an appointment reserved for an aircraft for a maintenance or repair to be conducted upon. A person of ordinary skill in the art, after viewing the entirety of this disclosure, would appreciate the various elements of data pertaining to a record of data in the context of maintenance and repair.

With continued reference to FIG. 1, in some embodiments, computing device 128 may be communicatively connected to electric aircraft 104 via network 132. A "network", for the purpose of this disclosure, is any medium configured to facilitate communication between two or more devices. Network 132 may include any mesh network described in this disclosure, for example without limitation an avionic mesh network. For instance and without limitation, the avionic mesh network may be consistent with the avionic mesh network in U.S. patent application Ser. No. 17/348,916 and entitled "METHODS AND SYSTEMS FOR SIMULATED OPERATION OF AN ELECTRIC VERTICAL TAKE-OFF AND LANDING (EVTOL) AIRCRAFT," which is incorporated by reference herein in its entirety. In a non-limiting embodiment, network 132 may include a central mesh network and a plurality of local mesh networks. A "central mesh network," as used in this disclosure, is a mesh network used by a fleet of electric aircrafts, wherein each node of the central mesh network includes an entity that is associated with the fleet. Any mesh network may include a computing device such as computing device 128 to be configured to generate nodes to its mesh network. In a non-limiting embodiment, each node of a central mesh network may include any electric aircraft of the same fleet and any entity such as, but not limited to, a ground station associated with the fleet, a fleet manager of the fleet of electric aircrafts operating a remote device, and the like thereof. A "local mesh network," as used in this disclosure, is a mesh network created by the computing device of an electric aircraft of the fleet, wherein the electric aircraft is the central node of its local mesh network. In a non-limiting embodiment, each electric aircraft may be the central node if its respective local mesh network. This is so, at least in part, because an electric aircraft of the fleet may detect other entities not associated with the fleet such as, but not limited to, other aircrafts, an air traffic control authority, and the like thereof, that the central mesh network of the fleet may not be in range of detecting the other entities. A central mesh network and/or the local mesh network may include some security program such as an authentication module to authorize some level of communication between the electric aircraft and the other entities. In a non-limiting embodiment, a central mesh network may authenticate the other entities and generate additional nodes into the central mesh network temporarily. In another non-limiting embodiment, the central mesh network may merge with the plurality of local mesh networks. Alternatively or additionally, a central mesh network may be a merge of the plurality of local mesh networks. In some embodiments, the central mesh network may generate the additional nodes and integrate them into the central mesh network and delete those nodes. A central mesh network may only temporarily generate the additional nodes to allow for any data the central mesh network may have to be sent over to the other entities via the additional nodes. A central mesh network may then delete those nodes once communication is complete. A central mesh network may include a central node, which may be a ground station associated with the fleet and/or a fleet manager, wherein the range of the central mesh network originates from the position of the central node. Persons skilled in the art, upon reviewing the entirety of this disclosure, will be aware of various levels of access of nodes and data for purposes as described herein.

Figure 2:
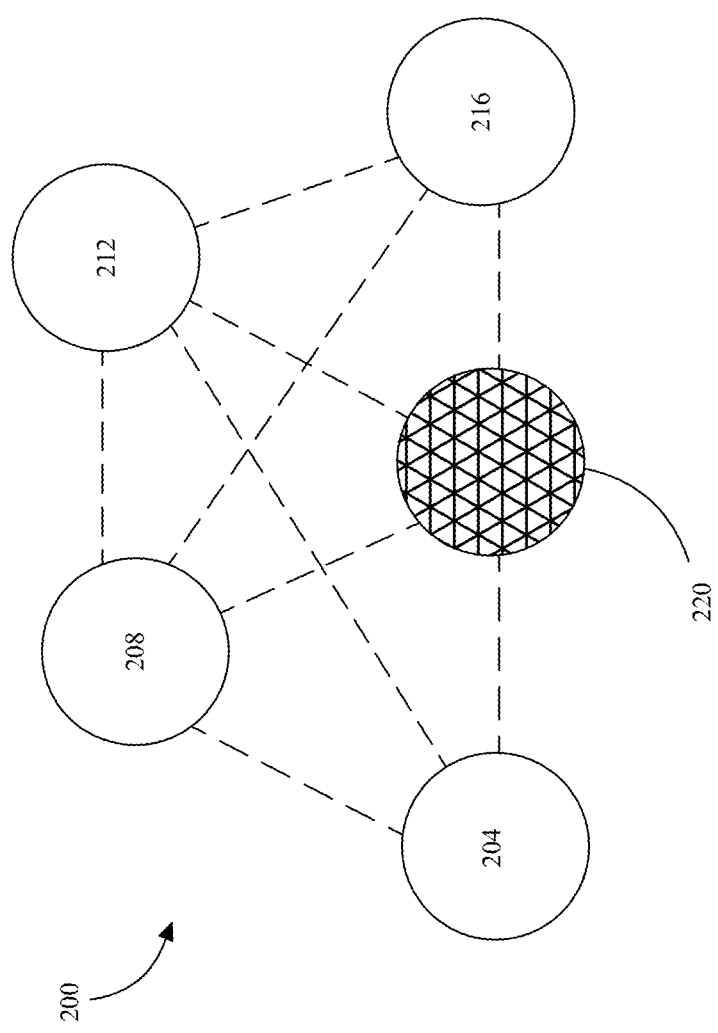
FIG. 2 is a block diagram of an exemplary embodiment of a mesh network for an aircraft.

Now referring to FIG. 2, a system 200 for a network is illustrated. The network may be consistent with network 132 as described in FIG. 1. In some embodiments, system 200 may include nodes 204, 208, 212, and 216. For instance and without limitation, the network may be consistent with the mesh network in U.S. patent application Ser. No. 17/478,067 and entitled, "ASSEMBLY FOR A MESH NETWORK FOR USE IN AIRCRAFTS," which is incorporated by reference herein in its entirety. In a non-limiting embodiment, each node may represent an electric aircraft such as electric aircraft 104, charging station, and/or charging connector 120. System 200 shows inactive node 220. Inactive node 220 may include a physically damaged node generating component, data corrupted node, and/or powered down node. In a non-limiting example, node 204 may be configured to transmit data to inactive node 220. Inactive node 220 may be configured to relay data from node 204 to node 216. Node 204 may be configured to communicate with another node to relay data to node 216 in the case that inactive node 220 may not be functioning. In some embodiments, node 204 may be configured to relay data to node 208. Node 208 may be configured to relay data from node 204 to node 216. In some embodiments, node 204 may be configured to transmit data to node 212. Node 212 may be configured to relay data from node 204 to node 216. Any node of system 200 may be configured to relay data from one node to another through an alternate pathway in an event a node may be inactive. In some embodiments, nodes of system 200 may be configured to choose a data transmission pathway from one node to another node. A "data transmission pathway" as used in this disclosure is a selection of communication from one node to one or more other nodes. In some embodiments, a data transmission pathway may be calculated based on, but not limited to, signal strength, node distance, number of nodes, node traffic, inactive nodes, active nodes, and the like. In a non-limiting example, node 204 may transmit data to node 216 through node 212. Node 212 may have a slow response time communicating data to node 204. Node 204 may detect a slow response time of node 212 and update a pathway of transmission by communicating data to node 208 which may relay data to node 216. In some embodiments, system 200 may utilize a machine learning model to predict optimal data transmission pathways of nodes. A machine learning model may input a plurality of node connections and output an optimal data transmission pathway between nodes. In some embodiments, a machine learning model may be trained on training data correlating node connections to an optimal data transmission pathway. System 200 may utilize a machine learning model to update connections between nodes that may assist in transmission speed, data security, and the like.

Figure 3:
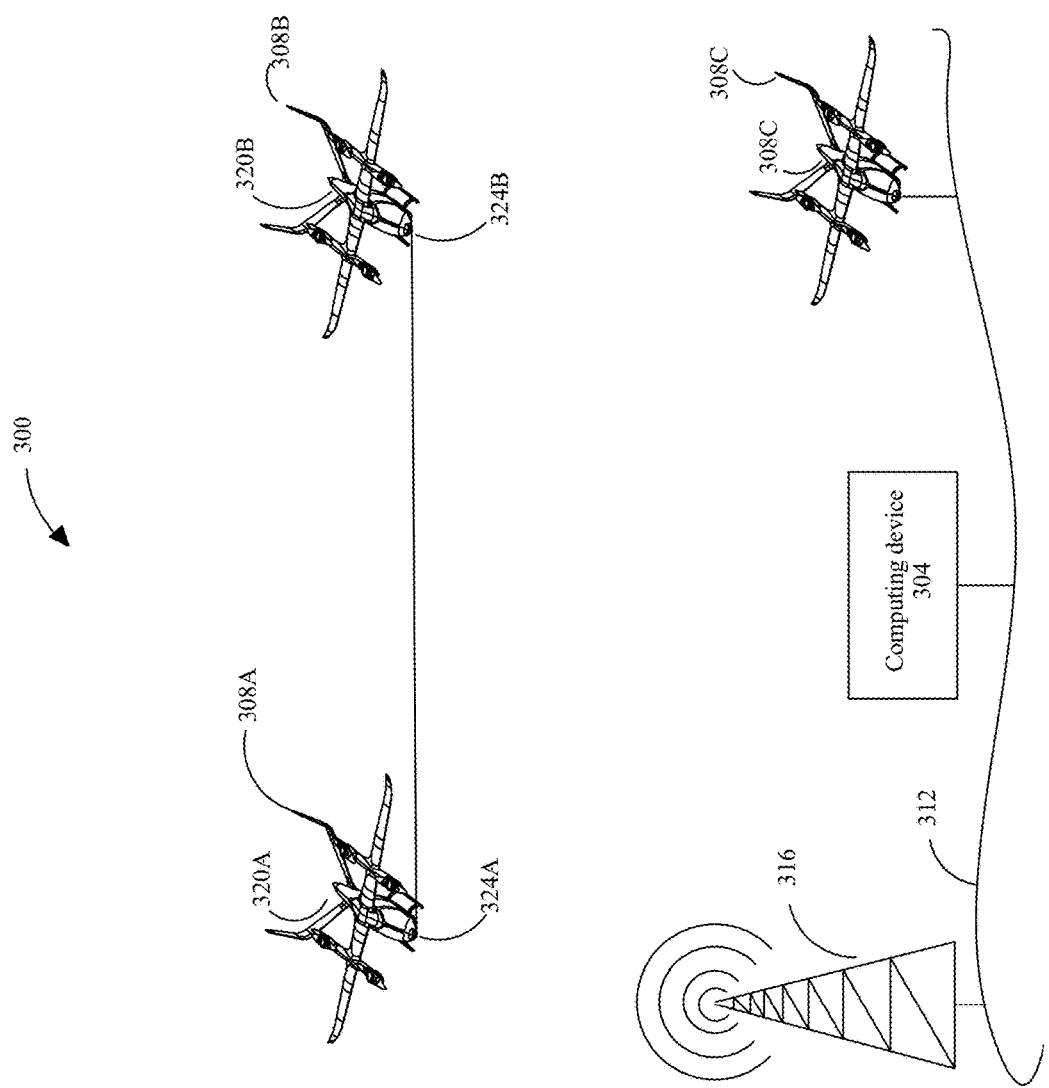
FIG. 3 is an illustration of an exemplary embodiment of an avionic mesh network.

Referring to FIG. 3, an avionic mesh network 300 is schematically illustrated. According to some embodiments, an avionic mesh network may include a single network. Alternatively or additionally, an avionic mesh network may include more than a single network. A single networks may be differentiated according to address, for example Internet Protocol address, gateway, or name server used. For example, in some cases, multiple networks may use different gateways, even though the multiple networks may still be within communicative connection with one another.

With continued reference to FIG. 3, in some embodiments, an avionic mesh network 300 may include inter-aircraft network nodes, intra-aircraft network nodes, as well as non-aircraft network nodes. As used in this disclosure, a "network node" is any component communicatively coupled to at least a network. For example, a network node may include an endpoint, for example a computing device on network, a switch, a router, a bridge, and the like. A network node may include a redistribution point, for example a switch, or an endpoint, for example a component communicatively connected to network. As used in this disclosure, "inter-aircraft network nodes" are two or more network nodes that are physically located in two or more aircraft and communicatively connected by way of an inter-aircraft network. As used in this disclosure, "intra-aircraft network nodes" are two or more intra-aircraft network nodes that are each physically located within a single aircraft and communicatively connected. As used in this disclosure, a "non-aircraft network node" is a network node that is not located on an aircraft and is communicatively connected to a network.

With continued reference to FIG. 3, in some embodiments, avionic mesh network 300 may include a wireless mesh network organized in a mesh topology. A mesh topology may include a networked infrastructure in which network nodes may be connected directly, dynamically, and/or non-hierarchically to many other nodes (e.g., as many other nodes as possible). In some cases, a mesh topology may facilitate cooperation between network nodes, for example redistributive network nodes, in routing of communication between network participants (e.g., other network nodes). A mesh topology may facilitate a lack of dependency on any given node, thereby allowing other nodes to participate in relaying communication. In some cases, mesh networks may dynamically self-organize and self-configure. Self-configuration enables dynamic distribution of workloads, particularly in event a network node failure, thereby contributing to fault-tolerance and reduced maintenance requirements. In some embodiments, mesh networks can relay messages using either a flooding technique or a routing technique. A flooding technique sends a message to every network node, flooding network with the message. A routing technique allows a mesh network to communicate a message is propagated along a determined nodal path to the message's intended destination. Message routing may be performed by mesh networks in part by ensuring that all nodal paths are available. Nodal path availability may be ensured by maintaining continuous nodal network connections and reconfiguring nodal paths with an occurrence of broken nodal paths. Reconfiguration of nodal paths, in some cases, may be performed by utilizing self-healing algorithms, such as without limitation Shortest Path Bridging. Self-healing allows a routing-based network to operate when a node fails or when a connection becomes unreliable. In some embodiments, a mesh network having all network nodes connected to each other may be termed a fully connected network. Fully connected wired networks have advantages of security and reliability. For example, an unreliable wired connection between two wired network nodes will only affect only two nodes attached to the unreliable wired connection.

With continued reference to FIG. 3, an exemplary avionic mesh network 300 is shown providing communicative connection between a computing device 304 and aircraft 308A-C. Computing device 304 may include any computing device described in this disclosure. In some embodiments, computing device 304 may be connected to a terrestrial network 312. Terrestrial networks 312 may include any network described in this disclosure and may include, without limitation, wireless networks, local area networks (LANs), wide area networks (WANs), ethernet, Internet, mobile broadband, fiber optic communication, and the like. In some cases, a grounded aircraft 308C may be connected to an avionic mesh network 300 by way of a terrestrial network 312. In some cases, avionic mesh network 300 may include a wireless communication node 316. A wireless communication node 316 may provide communicative connection by way of wireless networking. Wireless networking may include any wireless network method described in this disclosure, including without limitation Wi-Fi, mobile broadband, optical communication, radio communication, and the like. In some cases, wireless communication node 316 may be configured to connect with a first airborne aircraft in flight 308A. First airborne aircraft in some embodiments may include at least a first intra-aircraft network node 320A. As described above, first intra-aircraft network node 320A may be configured to connect to other nodes within first airborne aircraft 308A. In some cases, avionic mesh network 300 may be configured to provide inter-aircraft communication, for instance by using a first inter-aircraft network node 324A. In some cases, first inter-aircraft network node may be configured to communicate with a second inter-aircraft network node 324B. Inter-aircraft nodes 320A-B may include radio communication and/or optical wireless communication, for example free space optical communication.

With continued reference to FIG. 3, avionic mesh network 300 may be additionally configured to provide for encrypted and/or secured communication between components, i.e., nodes, communicative on the network. In some cases, encrypted communication on network 300 may be provided for by way of end-to-end encryption. Exemplary non-limited end-to-end encryption methods include symmetric key encryption, asymmetric key encryption, public key encryption methods, private key encryption methods and the like. In some cases, avionic mesh network 300 and/or another network may be configured to provide secure key exchange for encryption methods. Exemplary non-limiting key exchange methods include Diffie-Hellman key exchange, Supersingular isogeny key exchange, use of at least a trusted key authority, password authenticated key agreement, forward secrecy, quantum key exchange, and the like. In some cases, an avionic mesh network 300 may include at least an optical network component, for example fiber optic cables, wireless optical networks, and/or free space optical network. In some cases, encrypted communication between network nodes may be implemented by way of optical network components. For example, quantum key exchange in some embodiments, may defeat man-in-the-middle attacks. This is generally because, observation of a quantum assembly disturbs the quantum assembly. Quantum key exchange in some cases, uses this general characteristic of quantum physics to communicate sensitive information, such as an encryption key, by encoding the sensitive information in polarization state of quantum of radiation. At least a polarization sensitive detector may be used to decode sensitive information.

Figure 4:
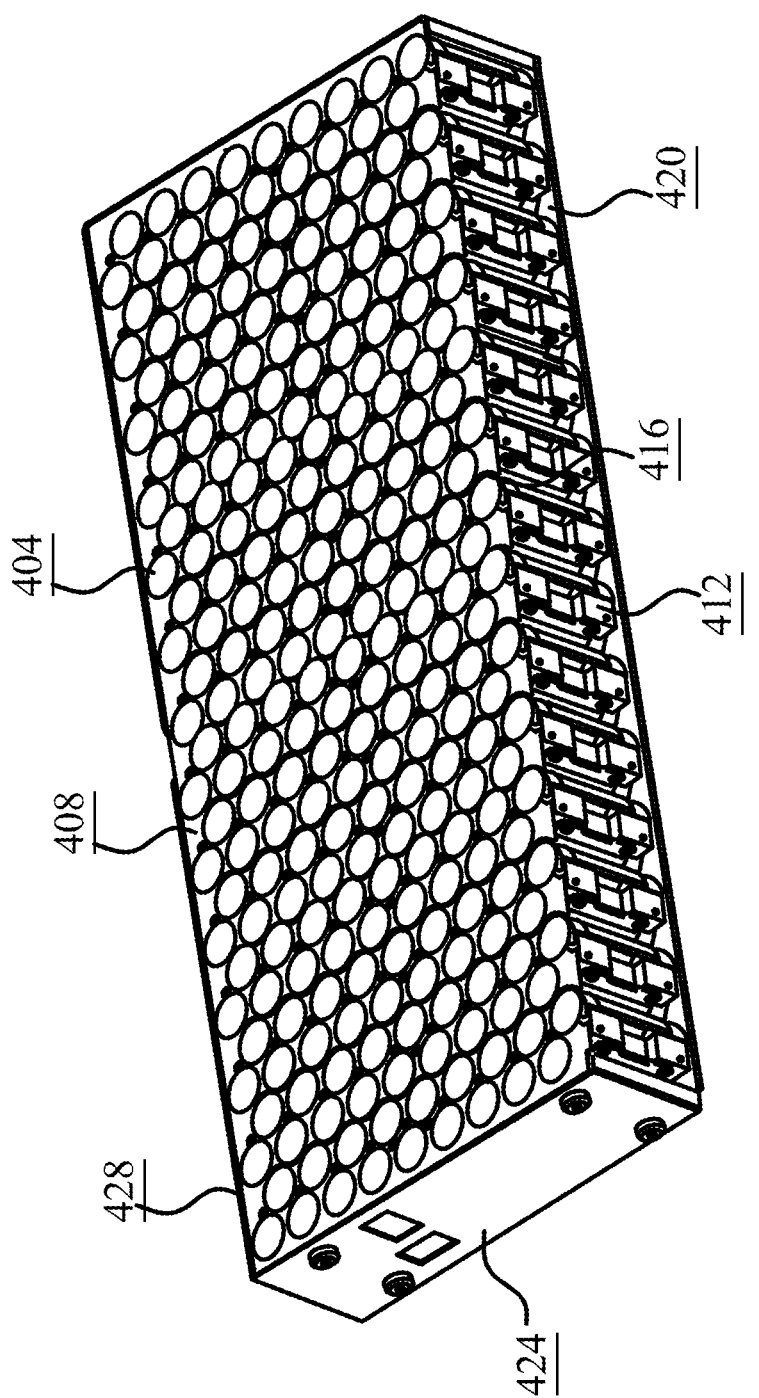
FIG. 4 schematically illustrates an exemplary battery module.

Referring now to FIG. 4, battery module 400 with multiple battery units 416 is illustrated, according to embodiments. Battery module 400 may comprise a battery cell 404, cell retainer 408, cell guide 412, protective wrapping 416, back plate 420, end cap 424, and side panel 428. Battery module 400 may comprise a plurality of battery cells, an individual of which is labeled 404. In embodiments, battery cells 404 may be disposed and/or arranged within a respective battery unit 416 in grouping of any number of columns and rows. For example, in the illustrative embodiment of FIG. 4, battery cells 404 are arranged in each respective battery unit 416 with 18 cells in two columns. It should be noted that although the illustration may be interpreted as containing rows and columns, that the grouping of battery cells in a battery unit, that the rows are only present as a consequence of the repetitive nature of the pattern of staggered battery cells and battery cell holes in cell retainer being aligned in a series. While in the illustrative embodiment of FIG. 4 battery cells 404 are arranged 18 to battery unit 416 with a plurality of battery units 416 comprising battery module 400, one of skill in the art will understand that battery cells 404 may be arranged in any number to a row and in any number of columns and further, any number of battery units may be present in battery module 400. According to embodiments, battery cells 404 within a first column may be disposed and/or arranged such that they are staggered relative to battery cells 404 within a second column. In this way, any two adjacent rows of battery cells 404 may not be laterally adjacent but instead may be respectively offset a predetermined distance. In embodiments, any two adjacent rows of battery cells 404 may be offset by a distance equal to a radius of a battery cell. This arrangement of battery cells 404 is only a non-limiting example and in no way preclude other arrangement of battery cells.

With continued reference to FIG. 4, in some embodiments, battery cells 404 may be fixed in position by cell retainer 408. For the illustrative purposed within FIG. 4, cell retainer 408 is depicted as the negative space between the circles representing battery cells 404. Cell retainer 408 comprises a sheet further comprising circular openings that correspond to the cross-sectional area of an individual battery cell 404. Cell retainer 408 comprises an arrangement of openings that inform the arrangement of battery cells 404. In embodiments, cell retainer 408 may be configured to non-permanently, mechanically couple to a first end of battery cell 404.

With continued reference to FIG. 4, according to embodiments, battery module 400 may further comprise a plurality of cell guides 412 corresponding to each battery unit 416. Cell guide 412 may comprise a solid extrusion with cutouts (e.g. scalloped) corresponding to the radius of the cylindrical battery cell 404. Cell guide 412 may be positioned between the two columns of a battery unit 416 such that it forms a surface (e.g. side surface) of the battery unit 416. In embodiments, the number of cell guides 412 therefore match in quantity to the number of battery units 416. Cell guide 412 may comprise a material suitable for conducting heat.

With continued reference to FIG. 4, battery module 400 may also comprise a protective wrapping woven between the plurality of battery cells 404. Protective wrapping may provide fire protection, thermal containment, and thermal runaway during a battery cell malfunction or within normal operating limits of one or more battery cells 404 and/or potentially, battery module 400 as a whole. Battery module 400 may also comprise a backplate 420. Backplate 420 is configured to provide structure and encapsulate at least a portion of battery cells 404, cell retainers 408, cell guides 412, and protective wraps. End cap 424 may be configured to encapsulate at least a portion of battery cells 404, cell retainers 408, cell guides 412, and battery units 416, as will be discussed further below, end cap may comprise a protruding boss that clicks into receivers in both ends of back plate 420, as well as a similar boss on a second end that clicks into sense board. Side panel 428 may provide another structural element with two opposite and opposing faces and further configured to encapsulate at least a portion of battery cells 404, cell retainers 408, cell guides 412, and battery units 416.

With continued reference to FIG. 4, in embodiments, battery module 400 can include one or more battery cells 404. In another embodiment, battery module 400 comprises a plurality of individual battery cells 404. Battery cells 404 may each comprise a cell configured to include an electrochemical reaction that produces electrical energy sufficient to power at least a portion of an electric aircraft. Battery cell 404 may include electrochemical cells, galvanic cells, electrolytic cells, fuel cells, flow cells, voltaic cells, or any combination thereof—to name a few. In embodiments, battery cells 404 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 404 may use the term 'wired', but one of ordinary skill in the art would appreciate that this term is synonymous with 'electrically connected', and that there are many ways to couple electrical elements like battery cells 404 together. As an example, battery cells 404 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 404 may be wired in a series-parallel circuit which combines characteristics of the constituent circuit types to this combination circuit. Battery cells 404 may be electrically connected in any arrangement which may confer onto the system the electrical advantages associated with that arrangement such as high-voltage applications, high-current applications, or the like. As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

With continued reference to FIG. 4, according to embodiments and as discussed above, any two rows of battery cells 404 and therefore cell retainer 408 openings are shifted one half-length so that no two battery cells 404 are directly next to the next along the length of the battery module 400, this is the staggered arrangement presented in the illustrated embodiment of FIG. 4. Cell retainer 408 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 408 may comprise staggered openings that align with battery cells 404 and further configured to hold battery cells 404 in fixed positions. Cell retainer 408 may comprise an injection molded component. Injection molded component may comprise a component manufactured by injecting a liquid into a mold and letting it solidify, taking the shape of the mold in its hardened form. Cell retainer 408 may comprise liquid crystal polymer, polypropylene, polycarbonate, acrylonitrile butadiene styrene, polyethylene, nylon, polystyrene, polyether ether ketone, to name a few. Cell retainer 408 may comprise a second cell retainer fixed to the second end of battery cells 404 and configured to hold battery cells 404 in place from both ends. The second cell retainer may comprise similar or the exact same characteristics and functions of first cell retainer 408. Battery module 400 may also comprise cell guide 412. Cell guide 412 includes material disposed in between two rows of battery cells 404. In embodiments, cell guide 412 can be configured to distribute heat that may be generated by battery cells 404.

With continued reference to FIG. 4, battery module 400 may also comprise back plate 420. Back plate 420 is configured to provide a base structure for battery module 400 and may encapsulate at least a portion thereof. Backplate 420 can have any shape and includes opposite, opposing sides with a thickness between them. In embodiments, back plate 420 may comprise an effectively flat, rectangular prism shaped sheet. For example, back plate 420 can comprise one side of a larger rectangular prism which characterizes the shape of battery module 400 as a whole. Back plate 420 also comprises openings correlating to each battery cell 404 of the plurality of battery cells 404. Back plate 420 may comprise a lamination of multiple layers. The layers that are laminated together may comprise FR-4, a glass-reinforced epoxy laminate material, and a thermal barrier of a similar or exact same type as disclosed hereinabove. Back plate 420 may be configured to provide structural support and containment of at least a portion of battery module 400 as well as provide fire and thermal protection.

With continued reference to FIG. 4, battery module 400 may also comprise first end cap 424 configured to encapsulate at least a portion of battery module 400. End cap 424 may provide structural support for battery module 400 and hold back plate 420 in a fixed relative position compared to the overall battery module 400. End cap 424 may comprise a protruding boss on a first end that mates up with and snaps into a receiving feature on a first end of back plate 420. End cap 424 may comprise a second protruding boss on a second end that mates up with and snaps into a receiving feature on sense board.

With continued reference to FIG. 4, battery module 400 may also comprise at least a side panel 428 that may encapsulate two sides of battery module 400. Side panel 428 may comprise opposite and opposing faces comprising a metal or composite material. In the illustrative embodiment of FIG. 4, a second side panel 428 is present but not illustrated so that the inside of battery module 400 may be presented. Side panel(s) 428 may provide structural support for battery module 400 and provide a barrier to separate battery module 400 from exterior components within aircraft or environment.

Figure 5:
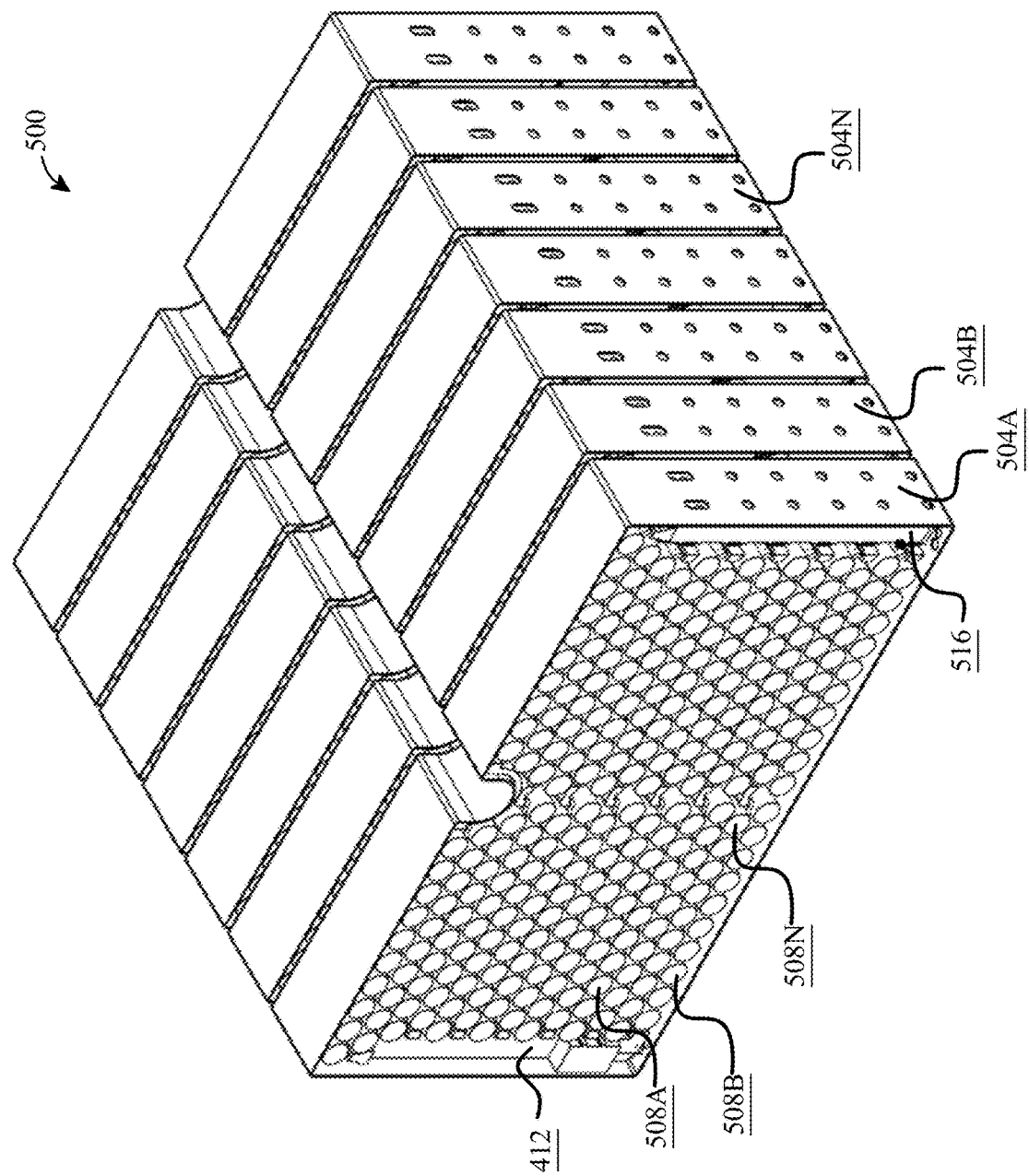
FIG. 5 is perspective drawings illustrating a battery pack, according to embodiments.

Referring now to FIG. 5, a perspective drawing of an embodiment of a battery pack with a plurality of battery modules disposed therein 500. The configuration of battery pack 500 is merely exemplary and should in no way be considered limiting. Battery pack 500 is configured to facilitate the flow of the media through each battery module of the plurality of battery modules to cool the battery pack. Battery pack 500 can include one or more battery modules 504A-N. Battery pack 500 is configured to house and/or encase one or more battery modules 504A-N. Each battery module of the plurality of battery modules 504A-N may include any battery module as described in further detail in the entirety of this disclosure. As an exemplary embodiment, FIG. 5 illustrates 7 battery modules 504A-N creating battery pack 500, however, a person of ordinary skill in the art would understand that any number of battery modules 504A-N may be housed within battery pack 500. In an embodiment, each battery module of the plurality of battery modules 504A-N can include one or more battery cells 508A-N. Each battery module 504A-N is configured to house and/or encase one or more battery cells 508A-N. Each battery cell of the plurality of battery cells 508A-N may include any battery cell as described in further detail in the entirety of this disclosure. Battery cells 508A-N may be configured to be contained within each battery module 504A-N, wherein each battery cell 508A-N is disposed in any configuration without limitation. As an exemplary embodiment, FIG. 5 illustrates 240 battery cells 508A-N housed within each battery module 504A-N, however, a person of ordinary skill in the art would understand that any number of battery units 508A-N may be housed within each battery module 504A-N of battery pack 500. Further, each battery module of the plurality of battery modules 504A-N of battery pack 500 includes circuit 512. Circuit 512 may include any circuit as described in further detail in the entirety of this disclosure. Each battery module of the plurality of battery modules 504A-N further includes second circuit 516. Second circuit 516 may include any circuit as described in further detail in the entirety of this disclosure. Persons skilled in the art, upon reviewing the entirety of this disclosure, will be aware of various configurations of the plurality of battery modules that may be utilized for the battery pack consistently with this disclosure.

With continued reference to FIG. 5, in some embodiments, a battery unit may be configured to couple to one or more other battery units, wherein the combination of two or more battery units forms at least a portion of vehicle battery and/or charging battery. Battery unit may be configured to include a plurality of battery cells. The plurality of battery cells may include any battery cell as described in the entirety of this disclosure. In the instant embodiment, for example and without limitation, battery unit includes a first row of battery cells, wherein first row of battery cells is in contact with the first side of the thermal conduit, as described in further detail below. As a non-limiting example, row of battery cells is configured to contain ten columns of battery cells. Further, in the instant embodiment, for example and without limitation, battery unit includes a second row of battery cells, wherein second row of battery cells is in contact with the second side of the thermal conduit, as described in further detail below. As a non-limiting example, second row of battery cells is configured to contain ten columns of battery cells. In some embodiments, battery unit may be configured to contain twenty battery cells in first row and second row. Battery cells of battery unit may be arranged in any configuration, such that battery unit may contain any number of rows of battery cells and any number of columns of battery cells. In embodiments, battery unit may contain any offset of distance between first row of battery cells and second row of battery cells, wherein the battery cells of first row and the battery cells of second row are not centered with each other. In the instant embodiment, for example and without limitation, battery unit includes first row and adjacent second row each containing ten battery cells, each battery cell of first row and each battery cell of second row are shifted a length measuring the radius of a battery cell, wherein the center of each battery cell of first row and each battery cell of second row are separated from the center of the battery cell in the adjacent column by a length equal to the radius of the battery cell. As a further example and without limitation, each battery cell of first row and each battery cell of second row are shifted a length measuring a quarter the diameter of each battery cell, wherein the center of each battery cell of first row and each battery cell of second row are separated from the center of a battery cell in the adjacent column by a length equal to a quarter of the diameter of the battery cell. First row of battery cells and second row of battery cells of the plurality of battery unit may be configured to be fixed in a position by utilizing a cell retainer, as described in the entirety of this disclosure. Each battery cell may be connected utilizing any means of connection as described in the entirety of this disclosure. In some embodiments, battery unit can include thermal conduit, wherein thermal conduit has a first surface and a second opposite and opposing surface. In some cases, height of thermal conduit may not exceed the height of battery cells, as described in the entirety of this disclosure. For example and without limitation, thermal conduit may be at a height that is equal to the height of each battery cell of first row and second row. Thermal conduit is configured to include an indent in the component for each battery cell coupled to the first surface and/or the second surface of thermal conduit. Persons skilled in the art, upon reviewing the entirety of this disclosure, will be aware of components that may be used as thermal conduits consistently with this disclosure.

With continued reference to FIG. 5, in some embodiments, thermal conduit may include at least a passage, wherein the plurality of passage comprises an opening starting at the first end of thermal conduit and terminating at a second, opposing end of thermal conduit. The "passage", as described herein, is a horizontal channel with openings on each end of the thermal conduit. The plurality of passage may be configured to have a hollow shape comprising one or more sides, at least two ends (e.g. a top and a bottom), and a length, wherein the hollow shape comprises a void having a shape the same as or different from the shape of the plurality of passage and terminating at an opposite, opposing second end of the shape. For example and without limitation, in some embodiments, the plurality of passage comprises a rectangle shaped tubular shape. In embodiments, the tubular component runs effectively perpendicular to each battery cell. In embodiments, the plurality of passage can be disposed such that it forms a void originating at a first side of the battery module and terminating at the second, opposite, and opposing side, of the battery module. According to embodiments, the plurality of passage and/or thermal conduit may be composed utilizing any suitable material. For example and without limitation, thermal conduit and/or the plurality of passage may be composed of polypropylene, polycarbonate, acrylonitrile butadiene styrene, polyethylene, nylon, polystyrene, polyether ether ketone, and the like.

With continued reference to FIG. 5, in some embodiments, the plurality of passage may be disposed in the thermal conduit such that the plurality of passage is configured to allow the travel of a media from a first end of thermal conduit to the second, opposite, and opposite end of thermal conduit. For example, the plurality of passage can be disposed to allow the passage of the media through the hollow opening/void of the plurality of passage. The media may include any media as described in the entirety of this disclosure. The hollow opening of thermal conduit and/or the plurality of passage may be configured to be of any size and/or diameter. For example and without limitation, the hollow opening of the plurality of passage may be configured to have a diameter that is equal to or less than the radius of each battery cell. The plurality of passage and/or thermal conduit may have a length equal or less than the length of one row of battery cells such that thermal conduit and/or the plurality of passage is configured to not exceed the length of first row and/or second row of battery cells. The opening of the plurality of passage can be configured to be disposed at each end of thermal conduit, wherein the plurality of passage may be in contact with each battery cell in a respective battery unit located at the end of each column and/or row of the battery unit. For example and without limitation, in some embodiments, a battery unit can contain two rows with ten columns of battery cells and the opening of the plurality of passage on each end of thermal conduit that is in contact with a respective battery cell at the end of each of the two columns. Persons skilled in the art, upon reviewing the entirety of this disclosure, will be aware of various components that may be used as at least a passage consistently with this disclosure.

With continued reference to FIG. 5, in some embodiments, circuit and/or thermal conduit may be configured to facilitate the flow of the media through each battery module of the plurality of battery modules to cool the battery pack. The media may include any media as described in further detail in the entirety of this disclosure. Circuit can include any circuit as described above in further detail. In the embodiment, circuit may be configured to couple to a first end of thermal conduit, wherein coupling is configured to facilitate the flow of the media from the circuit to the first end of thermal conduit through the plurality of passage. Coupling may include any coupling as described in further detail throughout the entirety of this disclosure. Circuit may include any component configured to facilitate the flow of media to the battery pack by utilizing an electrical current. For example and without limitation, circuit may include a printed circuit board, wherein the printed circuit board mechanically supports the electrical connection facilitating the flow of media to the battery pack. Circuit may be configured to include first end and a second end, wherein the second end is opposite the first end of circuit. In some embodiments, first end of circuit is in a plane perpendicular to the longitudinal axis of thermal conduit. First end of circuit is configured to include media feed component. The embodiment of circuit illustrates media feed component disposed only on first side of circuit, however this is non-limiting and circuit may include media feed component disposed on the second end of circuit. The media feed component of circuit may be configured to allow the media to feed into circuit, the battery module and/or the battery pack, wherein the flow of media may be initiated as a function of coupling media feed component of circuit to the media conductor of the thermal management apparatus. Media feed component can include any media feed component as described in further detail above. In some embodiments, media feed component is a threaded hole, wherein the media conductor of the thermal management apparatus is configured to couple to the threaded hole of media feed component, however this is non-limiting and media feed component may include, without limitation, a magnetic component, a latching mechanism, a pressure fit tubing mechanism, a nozzle mechanism, a hole, a flap, and the like.

With continued reference to FIG. 5, in some embodiments, thermal conduit can include any thermal conduit as described in further detail above. The height of thermal conduit may not exceed the height of each battery cell of the plurality of battery cells, in some cases, as described in the entirety of this disclosure. Thermal conduit may be composed of any suitable material, as described above in further detail above. Thermal conduit may be configured to include any curvature of the first side and/or second side of thermal conduit. For example and without limitation the curvature of the first side and/or second side of thermal conduit correlates at least a portion of a battery cell of the plurality of battery cells. As a further example and without limitation, in an embodiment, thermal conduit may be configured to include ten curves of the first surface of thermal conduit, wherein each curve is configured to contain the plurality of portion of each battery cell of the plurality of battery cells adjacent to the first surface of thermal conduit. As a further example and without limitation, in some embodiments, thermal conduit may be configured to include ten curves on the second surface of thermal conduit wherein each curve may be configured to contain the plurality of portion of each battery cell of the plurality of battery cells adjacent to the second surface of thermal conduit. The embodiment of thermal conduit illustrates ten curves on each surface of thermal conduit, however this is non-limiting and thermal conduit may include any number of curves on each surface of thermal conduit, wherein each curve corresponds to the plurality of portion of a battery cell of the plurality of battery cells.

With continued reference to FIG. 5, in some embodiments, thermal conduit can include any thermal conduit as described in further detail above. As described in further detail above, thermal conduit may be composed of any suitable material. Further, thermal conduit may be configured to include any curvature of the first side and/or second side of the thermal conduit, as described in further detail above. Thermal conduit may be configured to at least a passage. The plurality of passage can include any at least a passage as described in further detail above. The plurality of passage is configured to have a hollow shape comprising one or more sides, at least two ends (e.g. a top and a bottom), and a length, wherein the hollow shape comprises a void having a shape the same as or different from the shape of the plurality of passage and terminating at an opposite, opposing second end of the shape, as described above in further detail above. For example and without limitation, in the illustrative embodiment, the plurality of passage comprise a rectangle shaped tubular shape. In embodiments, the tubular component runs effectively perpendicular to each battery cell and/or curvature of thermal conduit configured to house each battery cell. In embodiments, the plurality of passage can be disposed such that it forms a void originating at a first side of the battery module and terminating at the second, opposite, and opposing side, of the battery module, as described in further detail in the entirety of this disclosure. According to embodiments, the plurality of passage and/or thermal conduit may be composed utilizing any suitable material, as described in further detail above. In embodiments, the plurality of passage may be disposed in the thermal conduit such that the plurality of passage may be configured to allow the travel of a media from a first end of thermal conduit to the second, opposite, and opposite end of thermal conduit, as described in further detail with respect to the entirety of this disclosure.

Figure 6:
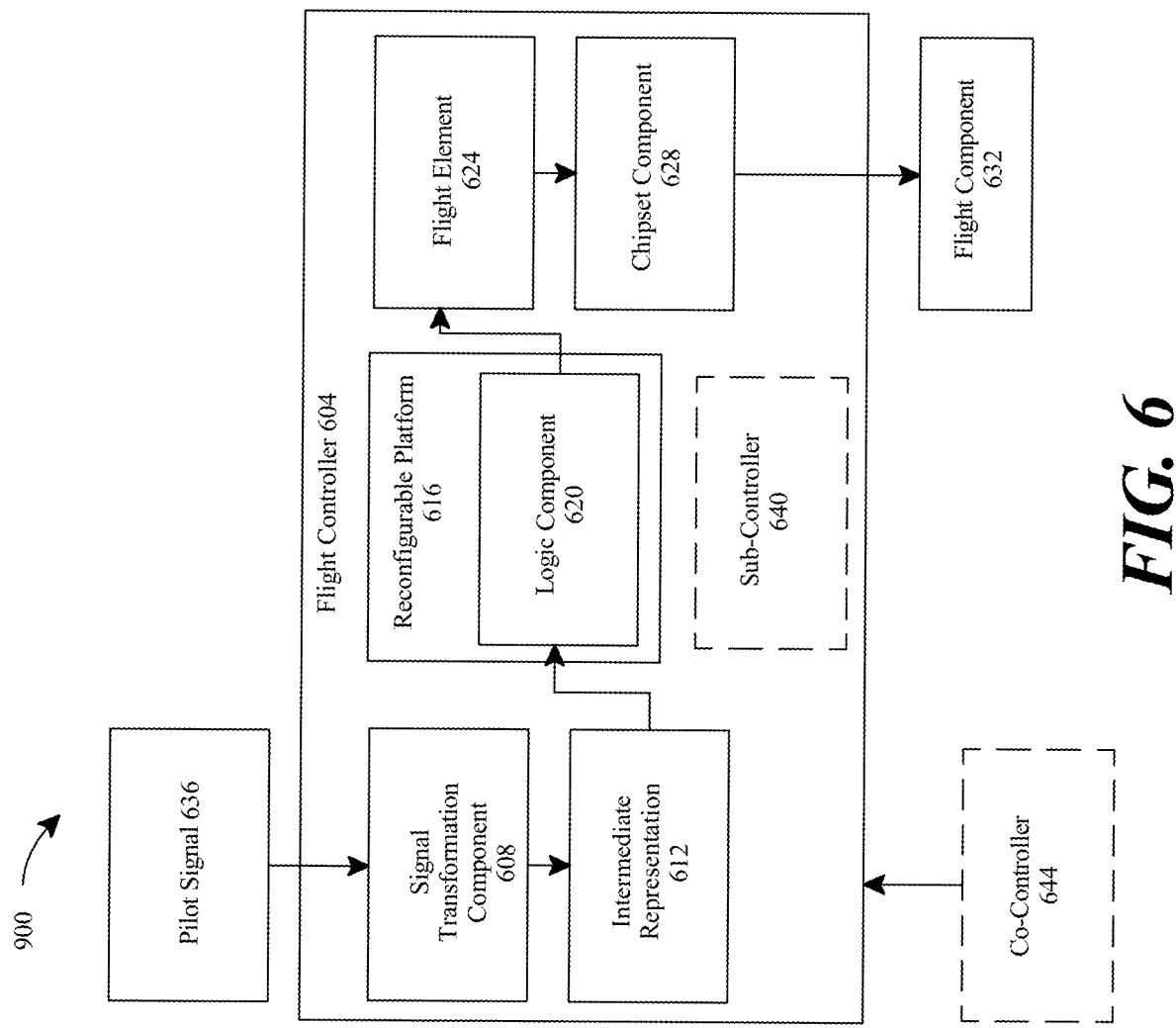
FIG. 6 is a block diagram of an exemplary embodiment of a flight controller.

Now referring to FIG. 6, an exemplary embodiment 600 of a flight controller 604 is illustrated. Flight controller 604 may be consistent with any flight controller 112 as described herein. In an embodiment, and with continued reference to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 6-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more assembly languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

With continued reference to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and with continued reference to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

With continued reference to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or assembly on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

In an embodiment, and with continued reference to FIG. 6, flight controller 604 may be configured generate an autonomous function. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and with continued reference to FIG. 6, flight controller 604 may generate autonomous function as a function of an autonomous machine-learning model. In some embodiments, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and with continued reference to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

With continued reference to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

With continued reference to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and with continued reference to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

With continued reference to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

With continued reference to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

With continued reference to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control assembly. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
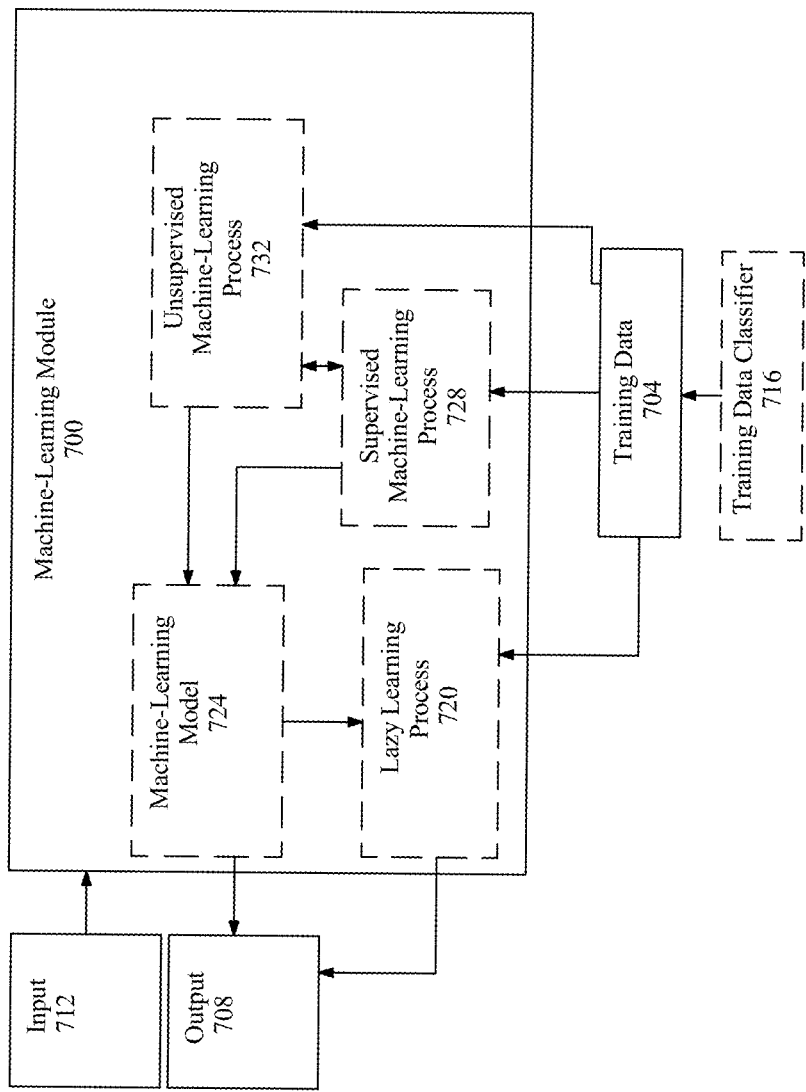
FIG. 7 is a block diagram of an exemplary machine-learning process.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes.

With continued reference to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example, an authentication datum and/or current aircraft datum may be inputs for an aircraft update datum output.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to specific flight information associated with an electric aircraft and/or level of authority or access for a user of electric aircraft for which a subset of training data may be selected.

With continued reference to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include the authentication datum and/or current aircraft datum as described above as inputs, the aircraft update datum as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
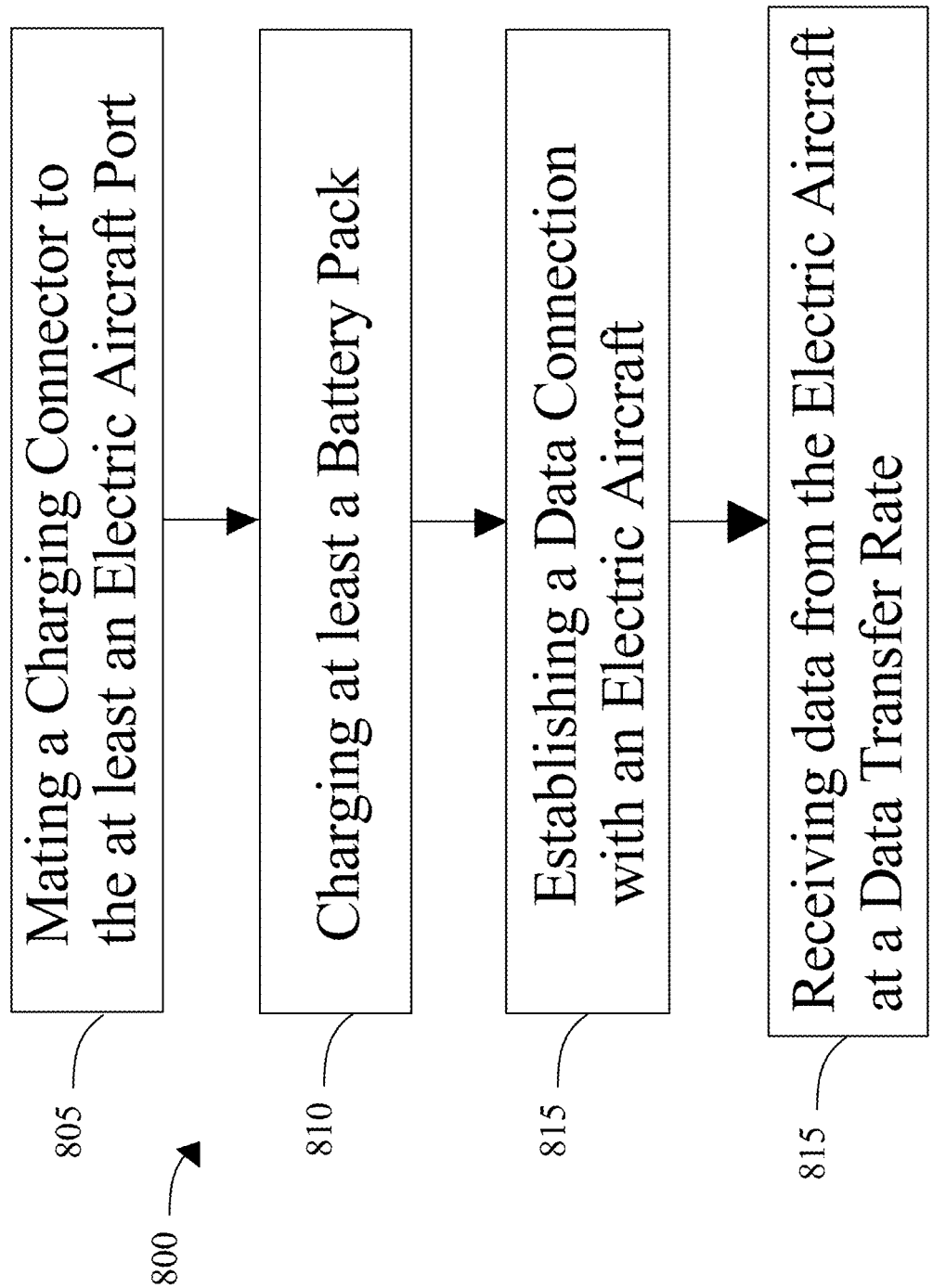
FIG. 8 is an exemplary flow diagram of a method of communicating data for electric aircraft using a charging connector.

Now referring to FIG. 8, an exemplary flow diagram of method 800 of communicating data for an electric aircraft using a charging connector is shown. Method 800 includes a step 805 of mating a charging connector to the at least an electric aircraft port of an electric aircraft. The charging connector may include a housing, housing at least a component of the charging connector. The charging connector may include a connector, connecting conductors. This may be implemented as disclosed with reference to FIGS. 1-7.

With continued reference to FIG. 8, method 800 includes a step 810 of establishing, using a computing device communicatively connected to the charging connector, a data connection with the electric aircraft. The data connection may include a wireless connection. The data connection may include a wired connection. In some embodiments, the charging connector may include a data connector configured to connect the electric aircraft port and the charging connector to conduct wired data connection. This may be implemented as disclosed with reference to FIGS. 1-7.

With continued reference to FIG. 8, method 800 includes a step 815 of receiving, using the computing device, data from the electric aircraft at a data transfer rate. In some embodiments, the data transfer rate is higher than 1 Gbit/s. In some embodiments, the data transfer period is less than an hour. In some embodiments, the computing device may be configured to transmit the data to a database. This may be implemented as disclosed with reference to FIGS. 1-7.

Figure 9:
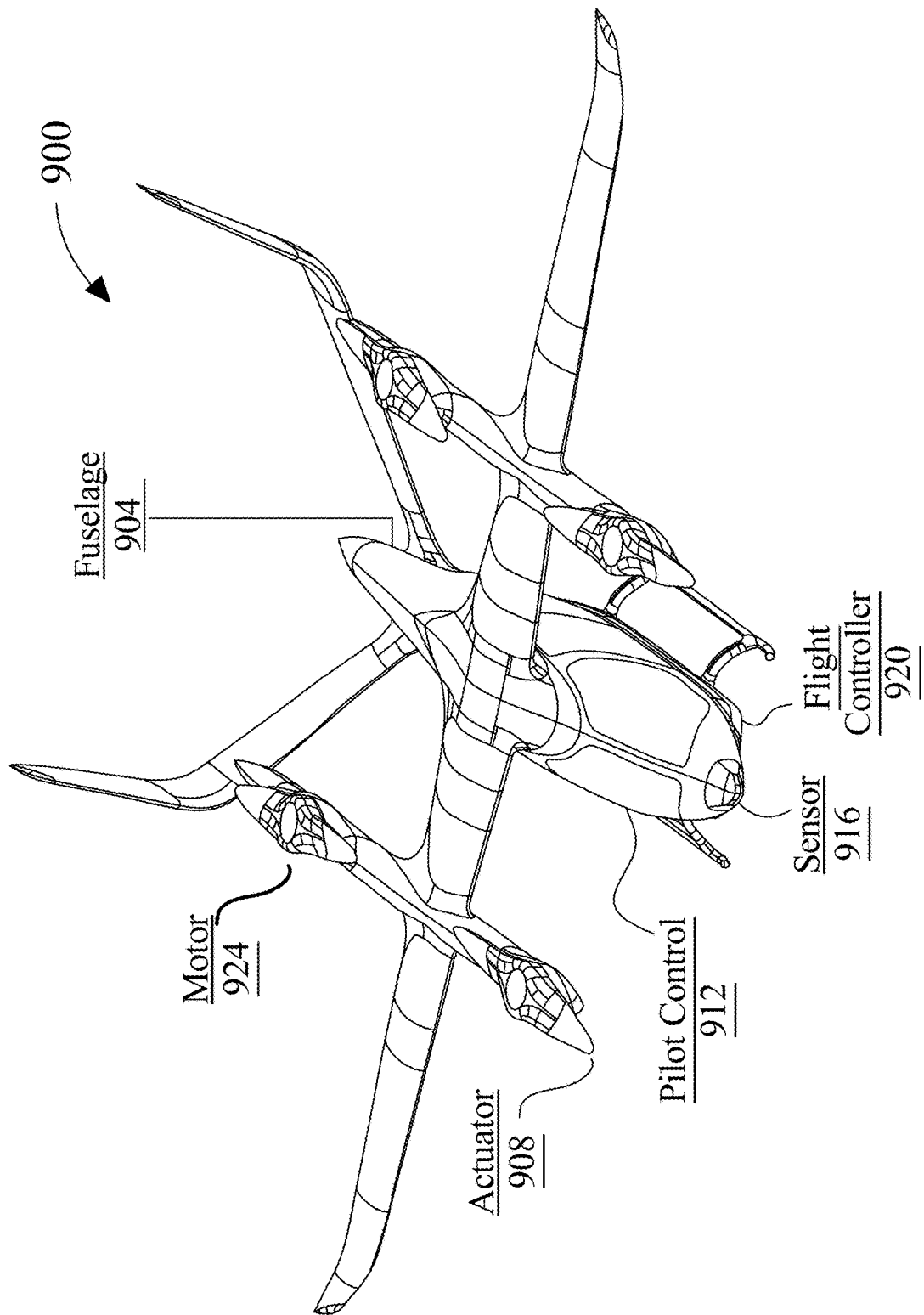
FIG. 9 is an illustration of an embodiment of an electric aircraft.

Referring now to FIG. 9, an exemplary embodiment of an aircraft 900 is illustrated. In an embodiment, aircraft 900 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 900 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, and titled "AN INTEGRATED ELECTRIC PROPULSION ASSEMBLY," the entirety of which is incorporated herein by reference.

With continued reference to FIG. 9, as used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 900, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quadcopter," multi-rotor helicopter, or other vehicle that maintains its lift primarily using downward thrusting propulsors. "Fixed-wing flight," as described herein, is where the aircraft is capable of flight using wings and/or foils that generate lift caused by the aircraft's forward airspeed and the shape of the wings and/or foils, such as airplane-style flight.

With continued reference to FIG. 9, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 904 may include structural elements that physically support a shape and structure of an aircraft. Structural elements may take a plurality of forms, alone or in combination with other types. Structural elements may vary depending on a construction type of aircraft such as without limitation a fuselage 904. Fuselage 904 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 9, aircraft fuselage 904 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 904 orthogonal to a longitudinal (nose to tail) axis of the aircraft and may form a general shape of fuselage 904. A former may include differing cross-sectional shapes at differing locations along fuselage 904, as the former is the structural element that informs the overall shape of a fuselage 904 curvature. In embodiments, aircraft skin may be anchored to formers and strings such that the outer mold line of a volume encapsulated by formers and stringers includes the same shape as aircraft 900 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

With continued reference to FIG. 9, aircraft 900 may include a plurality of flight components 908. As used in this disclosure a "flight component" is a component that promotes flight and guidance of an aircraft. In an embodiment, flight component 908 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed connector coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 9, plurality of flight components 908 may include at least a landing gear. The landing gear may be consistent with any landing gear as described in the entirety of this disclosure. In another embodiment, plurality of flight components 908 may include at least a propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis.

In an embodiment, and with continued reference to FIG. 9, plurality of flight components 908 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a assembly. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

With continued reference to FIG. 9, plurality of flight components 908 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 945 N to force aircraft to in a horizontal direction along the longitudinal axis. As a further non-limiting example, pusher component may twist and/or rotate to pull air behind it and, at the same time, push aircraft 900 forward with an equal amount of force. In an embodiment, and without limitation, the more air forced behind aircraft, the greater the thrust force with which aircraft 900 is pushed horizontally will be. In another embodiment, and without limitation, forward thrust may force aircraft 900 through the medium of relative air. Additionally or alternatively, plurality of flight components 908 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
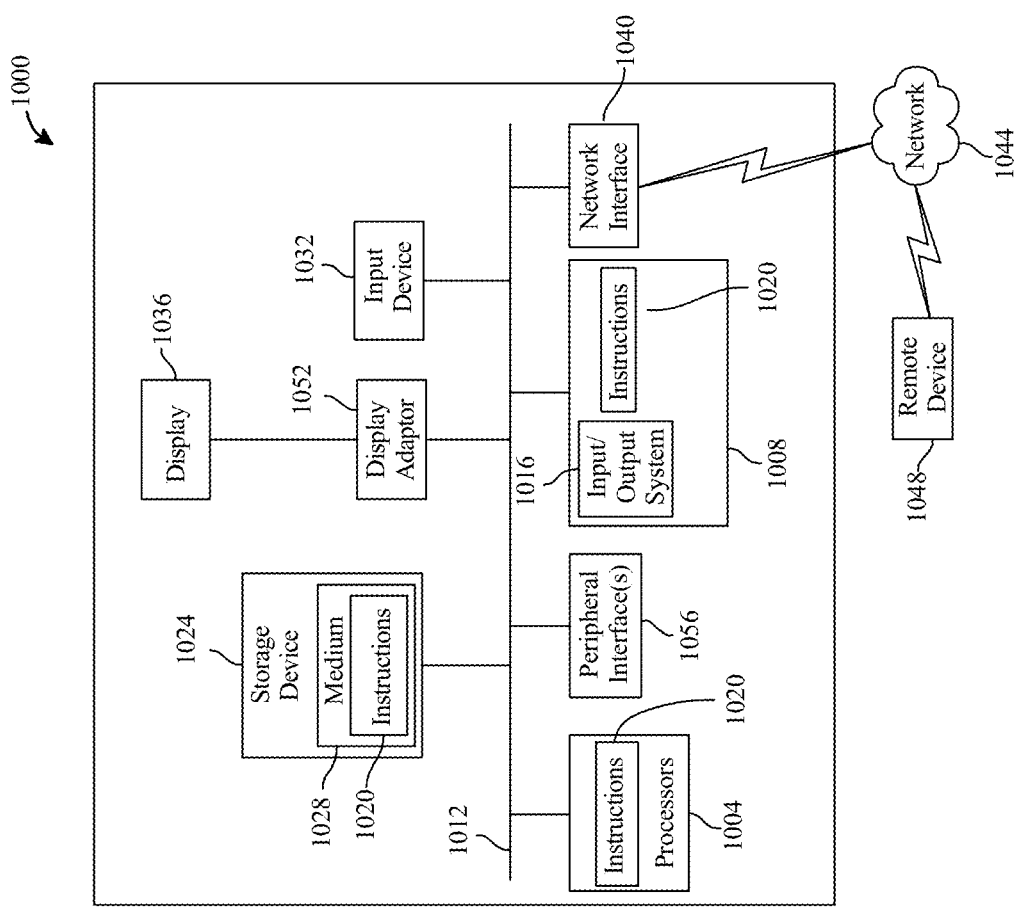
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system of data communication for an electric aircraft, the system comprising:
    a memory on an electric aircraft and communicatively connected to selected flight components of the electric aircraft, wherein the memory is configured to store flight history data comprising data from the selected flight components;
    a charging connector configured to:
        mate with at least an electric aircraft port of an electric aircraft; and
        charge at least a battery pack of the electric aircraft, wherein the charging connector comprises:
            a housing configured to house at least a component of the charging connector; and
            a data pin configured to:
                join conductors; and
                communicatively connect the electric aircraft port and the charging connector to conduct a wired data connection, wherein the charging connector is configured to transfer the flight history data from the memory by the wired data connection;
    a computing device off-board the electric aircraft and communicatively connected to the charging connector, wherein the computing device is configured to:
        authenticate the electric aircraft once the charging connector is plugged into the electric aircraft port;
        establish a data connection with the electric aircraft upon the authentication of the electric aircraft; and
        receive data over the data connection from the electric aircraft at a data transfer rate, wherein the received data comprises the flight history data.

2. The system of claim 1, wherein the charging connector is incorporated into ground service equipment, wherein the ground service equipment comprises ground charging equipment.

3. The system of claim 1, wherein the data connection is operated simultaneously as the charging connector is charging the at least a battery pack of the electric aircraft.

4. The system of claim 1, wherein the charging connector asynchronously charges the at least a battery pack and operates the data connection.

5. The system of claim 1, wherein a data transfer period of the data connection is less than an hour.

6. The system of claim 1, wherein the data transfer rate of the data connection is higher than 1 Gbit/s.

7. The system of claim 1, wherein the computing device is further configured to transmit the data to a database.

8. The system of claim 1, wherein the data connection comprises a wireless connection.

9. The system of claim 1, wherein the data comprises machine-learning data from a flight controller of the electric aircraft.

10. The system of claim 1, wherein the computing device is further configured to authenticate the electric aircraft before conducting the data connection.

11. The system of claim 1, wherein the computing device is communicatively connected to the electric aircraft using a network.

12. A method of communicating data for an electric aircraft using a charging connector, the process comprising:
communicatively connecting a memory on an electric aircraft to selected flight components of the electric aircraft, wherein the memory is configured to store flight history data comprising data from the selected flight components;
mating a charging connector to the at least an electric aircraft port of an electric aircraft, wherein the charging connector comprises:
a housing, wherein the housing houses at least a component of the charging connector; and
a data pin configured to join conductors;
communicatively connecting, using the data pin of the charging connector, the electric aircraft port and the charging connector to conduct wired data connection, wherein the charging connector is configured to transfer the flight history data from the memory by the wired data connection;
charging, by the charging connector, at least a battery pack of the electric aircraft;
authenticating the electric aircraft once the charging connector is plugged into the electric aircraft port;
establishing, using a computing device communicatively connected to the charging connector, a data connection with the electric aircraft upon the authentication of the electric aircraft; and
receiving, using the computing device, data from the electric aircraft at a data transfer rate, wherein the received data comprises the flight history data.

13. The method of claim 12, wherein the data connection comprises a wireless connection.

14. The method of claim 12, wherein the data connection comprises a wired connection.

15. The method of claim 12, further comprising:
transmitting, using the computing device, the data to a database.

16. The method of claim 12, further comprising:
communicatively connecting, using a network, the computing device and the electric aircraft.

* * * * *

UNITED STATES PATENT AND TRADEMARK OFFICE
CERTIFICATE OF CORRECTION

| | | |
|---|---|---|
| PATENT NO. | : 11,952,152 B1 | Page 1 of 1 |
| APPLICATION NO. | : 18/096818 | |
| DATED | : April 9, 2024 | |
| INVENTOR(S) | : Richard Donnelly et al. | |

It is certified that error appears in the above-identified patent and that said Letters Patent is hereby corrected as shown below:

In the Specification

In Column 38, Line 26 reads "...Ser. No. 16/603,225 and titled "AN INEGRATED ELECTRIC..." but it should read "...Ser. No. 16/703,225 and titled "AN INTEGRATED ELECTRIC..."

Signed and Sealed this
Twenty-first Day of May, 2024

Katherine Kelly Vidal
*Director of the United States Patent and Trademark Office*